United States Patent
Alloulah et al.

(10) Patent No.: US 9,954,713 B2
(45) Date of Patent: Apr. 24, 2018

(54) MINIMIZING INTER-SYMBOL INTERFERENCE IN OFDM SIGNALS

(71) Applicant: Imagination Technologies Limited, Kings Langley (GB)

(72) Inventors: Mohammed Alloulah, Bristol (GB); Paul Murrin, Chepstow (GB); Alamo Spaargaren, Bristol (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

(21) Appl. No.: 14/826,514

(22) Filed: Aug. 14, 2015

(65) Prior Publication Data

US 2016/0359656 A1    Dec. 8, 2016

(30) Foreign Application Priority Data

Jun. 4, 2015 (GB) .................................. 1509710.8

(51) Int. Cl.
*H04L 27/26* (2006.01)
*H04L 25/03* (2006.01)
*H04L 25/02* (2006.01)

(52) U.S. Cl.
CPC ........ *H04L 27/2665* (2013.01); *H04L 25/022* (2013.01); *H04L 25/0224* (2013.01); *H04L 25/03006* (2013.01); *H04L 25/03159* (2013.01); *H04L 27/265* (2013.01); *H04L 27/2675* (2013.01); *H04L 27/2695* (2013.01)

(58) Field of Classification Search
CPC ........... H04L 27/2665; H04L 25/03006; H04L 27/265
See application file for complete search history.

(56) References Cited

U.S. PATENT DOCUMENTS

| 6,459,744 B1 | 10/2002 | Helard et al. |
| 8,031,587 B1 | 10/2011 | Kang |
| 8,340,234 B1* | 12/2012 | Cheng ................. H04L 25/0212 375/348 |
| 2008/0137525 A1 | 6/2008 | Liu |
| 2009/0129511 A1* | 5/2009 | Vijayan ................. H04L 5/0048 375/340 |

(Continued)

FOREIGN PATENT DOCUMENTS

EP    1830501 A1    9/2007

OTHER PUBLICATIONS

Nov. 11, 2016 Extended Search Report issued in European Patent Application No. 16171754.

(Continued)

*Primary Examiner* — Freshteh N Aghdam
(74) *Attorney, Agent, or Firm* — Vorys, Sater, Seymour and Pease LLP; Vincent M DeLuca

(57) ABSTRACT

Methods and OFDM receivers for decoding an OFDM signal include estimating a channel impulse response from a pilot-dense symbol of the OFDM signal for each of a plurality of potential FFT window positions; determining a noise floor of each of the channel impulse responses; selecting the potential window position corresponding to the channel impulse response with the lowest noise floor as an optimum FFT window position; and decoding symbols of the OFDM signal using the optimum FFT window position.

20 Claims, 17 Drawing Sheets

(56) References Cited

U.S. PATENT DOCUMENTS

| | | | |
|---|---|---|---|
| 2009/0185630 A1* | 7/2009 | Yang | H04L 25/0212 |
| | | | 375/260 |
| 2010/0142659 A1* | 6/2010 | Gold-Gavriely | H04L 27/2688 |
| | | | 375/343 |
| 2010/0158170 A1* | 6/2010 | Li | H04L 27/2665 |
| | | | 375/346 |
| 2011/0158334 A1 | 6/2011 | Arambepola et al. | |
| 2011/0319088 A1 | 12/2011 | Zhou et al. | |
| 2013/0070869 A1* | 3/2013 | Motamed | H04L 5/0051 |
| | | | 375/295 |
| 2015/0043683 A1 | 2/2015 | Kato et al. | |

OTHER PUBLICATIONS

Zoellner Robert J. et al.; Adaptive Windowing for OFDM with Dense Subcarrier Spacing in Mobile Channels; pp. 1-6; XP-002718721.

NorDig Unified Test Specifications for Integrated Receiver Decoders, Nov. 2012. Version 2.2.2.

* cited by examiner

MINIMIZING INTER-SYMBOL INTERFERENCE IN OFDM SIGNALS

BACKGROUND

Orthogonal frequency-division multiplexing (OFDM) is a special multi-carrier modulation (MCM) technique in which a single data stream is transmitted over a number of lower rate orthogonal sub-carriers. An OFDM signal is generated from a serial stream of binary digits by dividing the input stream into N parallel streams. Each stream is mapped to a symbol stream using a modulation scheme, such as QAM (Quadrature Amplitude Modulation) or PSK (Phase-Shift Keying). An inverse fast Fourier transform (IFFT) is computed on each set of symbols to transform a set of sub-carriers into a time-domain signal. Each set of symbols transmitted at the same time is referred to as an OFDM symbol.

FIG. 1 illustrates an example OFDM frame 102 which comprises a block of OFDM symbols 104. To eliminate or reduce inter-symbol interference (ISI) a guard interval (GI) 106 is appended at the start of the data portion 108 of each symbol 104. As long as echoes fall within this interval, they will not affect the receiver's ability to correctly decode the symbol. Generally a cyclic prefix consisting of the end portion 110 of the data portion 108 of the symbol is transmitted during the guard interval 106.

Each OFDM symbol is decoded at an OFDM receiver by performing a FFT (Fast Fourier Transform) on the data portion 108 of the symbol 104. However, since the guard interval 106 includes a duplicate of the end portion 110 of the data portion 108 the FFT can be performed on any portion of the symbol equal to the data length. This is because any portion of the symbol equal to the data length will comprise all of the data. The portion of the symbol on which the FFT is performed is referred to as the FFT window. This may also alternatively be referred to as the FFT symbol window.

Accordingly, as shown in FIG. 2, the start of the FFT window for a particular symbol 104 may be positioned anywhere between the start 202 and end 204 of the guard interval 106. In particular, the FFT window may be at position A 206, position B 208 or anywhere in between (e.g. position C 210). The start 202 of the guard interval 106 may also be referred to as the starting edge, leading edge or the first edge of the guard interval 106. Similarly the end 204 of the guard interval 106 may also be referred to as the ending edge, following edge or the second edge of the guard interval 106.

In wireless OFDM systems an OFDM signal generated by a transmitter will typically reach the receiver via many different paths. For example, as shown in FIG. 3, the OFDM receiver may receive a primary or main signal 302 comprising symbol A; and a secondary signal or echo 304 also comprising symbol A, which is positively or negatively delayed in time with respect to the strongest main signal 302. It is advantageous to position the FFT window so the most amount of energy can be obtained from both the main signal 302 and the echo 304. For example, in FIG. 3, ideally the FFT window is positioned in the period 306 during which the main signal 302 and the echo 304 overlap (i.e. from the start of the main signal 302 until the end of the echo signal 304) so that symbol A can be correctly decoded via the main signal 302 and the echo 304. Accordingly, in the example of FIG. 3, the FFT window is preferably positioned at position A 308, position B 310 or anywhere in between (e.g. position C 312).

It is important to position the window correctly because distortions can arise by mis-positioning the FFT window. However, determining the correct location for the FFT window is difficult since there are typically many echoes or secondary signals, some of which may be quite weak (e.g. below 20 dB).

The embodiments described below are not limited to implementations which solve any or all of the disadvantages of known OFDM receivers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and OFDM receivers for decoding an OFDM signal. The method includes estimating a channel impulse response from a pilot-dense symbol of the OFDM signal for each of a plurality of potential FFT window positions; determining a noise floor of each of the channel impulse responses; selecting the potential window position corresponding to the channel impulse response with the lowest noise floor as an optimum FFT window position; and decoding symbols of the OFDM signal using the optimum FFT window position.

A first aspect provides a method of decoding an OFDM signal at an OFDM receiver, the method comprising: estimating a channel impulse response from a received pilot-dense symbol of the OFDM signal for each of a plurality of potential FFT window positions; determining a noise floor of each of the channel impulse responses; selecting the potential FFT window position corresponding to the channel impulse response with the lowest noise floor as an optimum FFT window position; and decoding symbols of the OFDM signal using the optimum FFT window position.

A second aspect provides an OFDM receiver comprising a channel impulse response generation module configured to estimate a channel impulse response from a pilot-dense symbol of an OFDM signal for each of a plurality of potential FFT window positions; a noise floor estimation module configured to determine a noise floor of each of the estimated channel impulse responses; and a FFT window position selection module configured to select the potential window position corresponding to the estimated channel impulse response with a lowest noise floor as an optimum FFT window position.

The methods described herein may be performed by a computer configured with software in machine readable form stored on a non-transitory storage medium, e.g. in the form of a computer program comprising computer readable program code for configuring a computer to perform the constituent portions of described methods or in the form of a computer program comprising computer program code adapted to perform all the steps of any of the methods described herein when the program is run on a computer and where the computer program may be embodied on a computer readable storage medium. Examples of such storage media include disks, thumb drives, memory cards etc. and do not include transitory signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
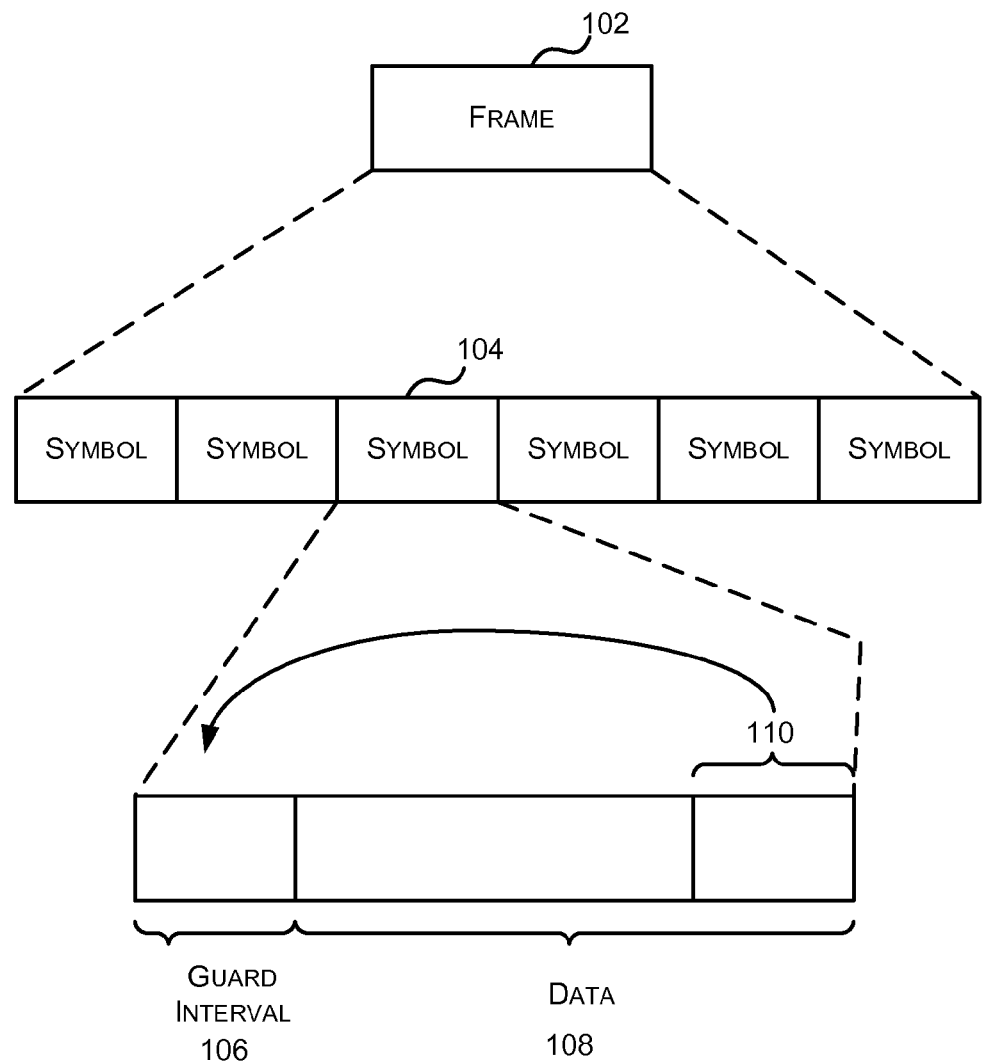
FIG. 1 is a schematic diagram of an OFDM frame.
Figure 2:
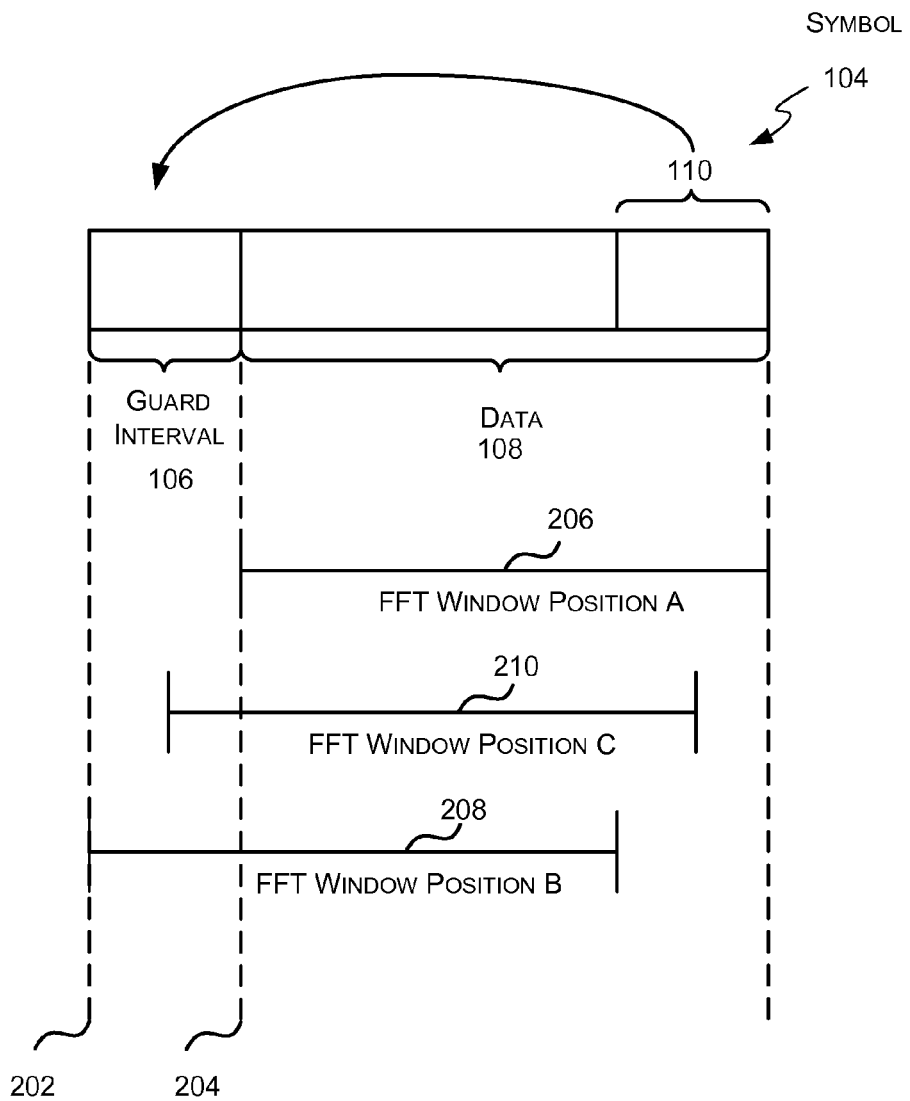
FIG. 2 is a schematic diagram of possible FFT window positions for decoding an OFDM symbol.
Figure 3:
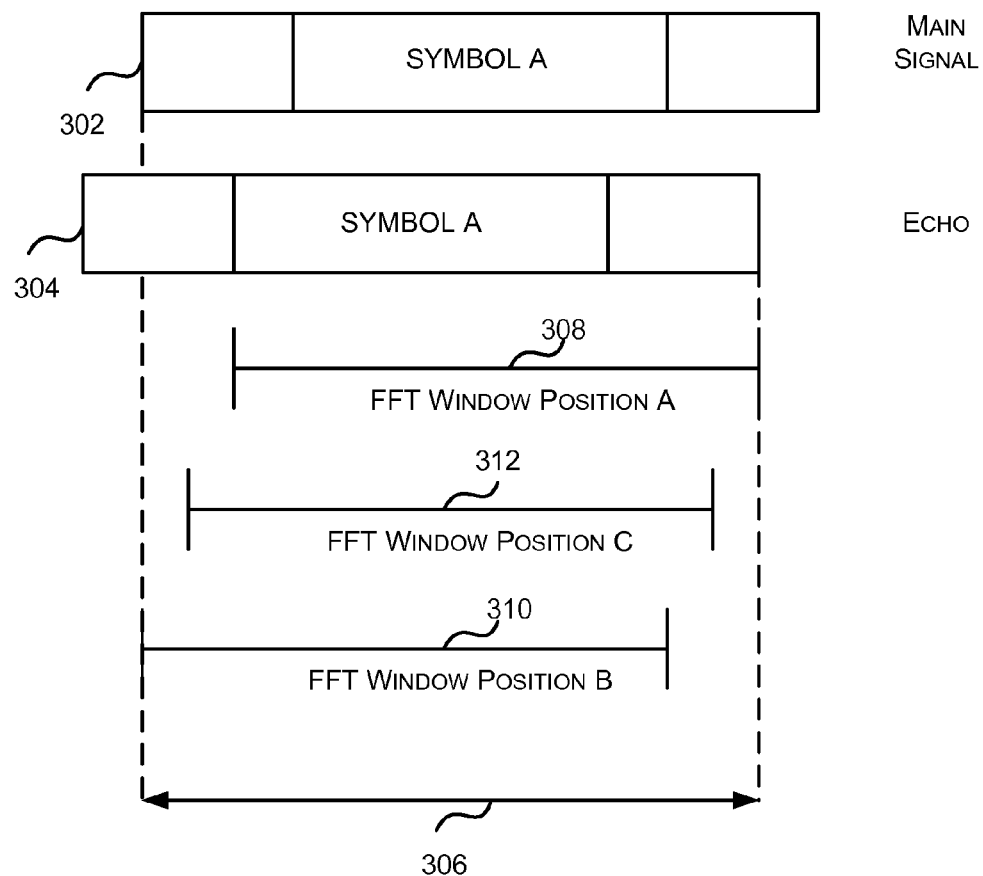
FIG. 3 is a schematic diagram of possible FFT window positions for decoding a multipath OFDM symbol.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, selecting the position of the FFT window to use in decoding symbols of an OFDM signal is an important task as distortions can arise from mis-positioning the FFT window. In particular, the distortions arising from mis-positioning the FFT window typically comprise inter-symbol interference (ISI) (i.e. adjacent symbol interference) and inter-carrier interference (ICI) (i.e. adjacent or self sub-carrier interference) which is commonly referred to as the total ISI.

Many known techniques to identify and select an FFT window make use of the pilot information embedded within an OFDM signal. In particular, each OFDM symbol is formed by data mapped onto a plurality of sub-carrier frequencies or cells. However, not all of the cells (or sub-carriers) are used to transmit data. Various cells, referred to as pilot cells, within an OFDM frame are modulated with reference information that is known to the receiver. These cells are then transmitted at a "boosted" power level. The pilots can be used for frame synchronization, frequency synchronization, time synchronization, channel estimation, transmission mode etc.

Existing solutions for identifying the FFT window position can be classified as either pilot-based or non-pilot based. For example, one pilot-based method relies on early-late power measurement of the pilots. Another non-pilot based method employs guard period correlation. Such methods generally tend to: lack sensitivity to weak echoes (e.g. below 20 dB) resulting in a suboptimal FFT window position; lack sensitivity to wide echoes (e.g. 5 times the cyclic prefix) resulting in a suboptimal FFT window position; produce asymmetric performance depending on whether echoes precede or proceed the main signal; have difficulties dealing with complex channels with many multipath components of various strength; and/or produce carrier-to-noise (C/N) dependent performance, resulting in deterioration beyond a certain signal quality, or a combination thereof.

Described herein is a frequency-based, pilot-aided method for reliably selecting the FFT window position so as to minimize total ISI particularly in systems with heavy attenuation and wide echoes. The method includes, estimating a channel impulse response from a pilot-dense symbol of an OFDM signal for each of a plurality of estimated FFT window positions; determining a noise floor of each of the channel impulse responses; and selecting the estimated window position corresponding to the channel impulse response with the lowest noise floor as an optimum FFT window position.

In particular, some OFDM-based standards, such as DVB-T2 (Digital Video Broadcasting-Second Generation Terrestrial), DVB-C2 (Digital Video Broadcasting-Cable), and Advanced Television Systems Committee (ATSC) 3.0 (as proposed) standards use pilot-dense symbols that have a higher number (or higher density) of pilot cells than other symbols, such as data symbols.

Figure 4:
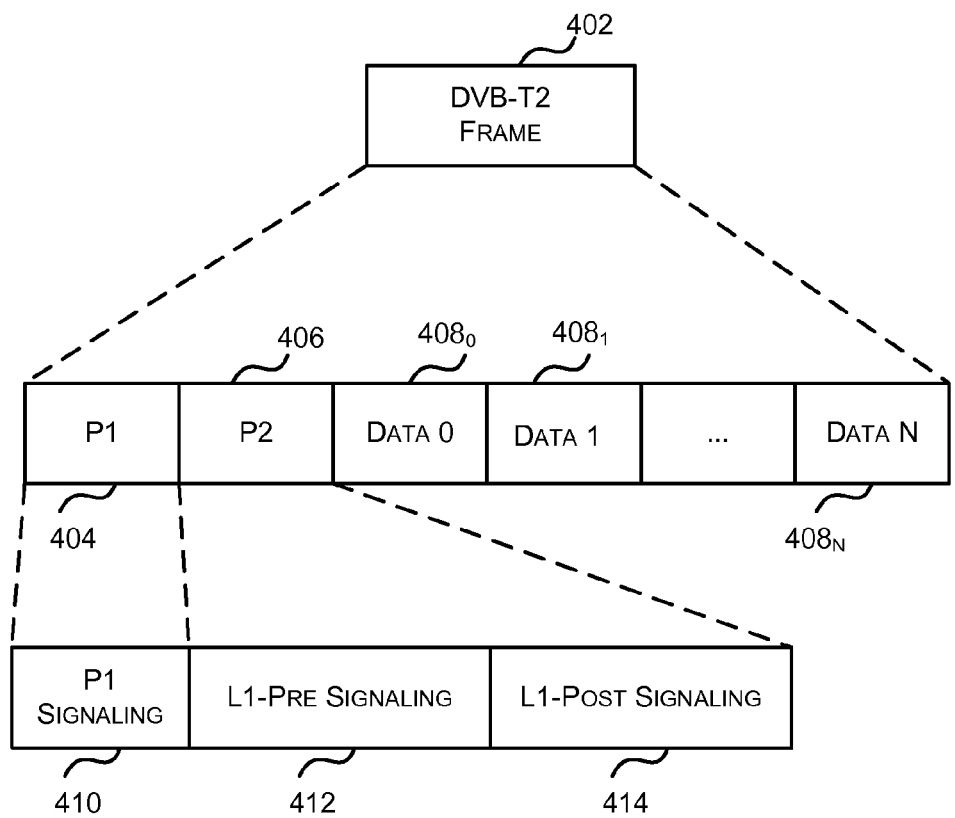
FIG. 4 is a schematic diagram of a DVB-T2 frame.

For example, reference is now made to FIG. 4 which illustrates the format of a DVB-T2 frame 402. The DVB-T2 frame 402 comprises a P1 symbol 404, one or more P2 symbols 406, and a number of normal or data symbols $408_0$ to $408_N$ where N is an integer greater than 1. In some configurations the last data symbol may be a frame closing symbol (not shown). The P1 symbol is used for synchronization and signaling purposes; the P2 symbol conveys L1 (layer 1) parameter configurations and some PLP (physical layer pipe) data; and the data symbols carry PLP data. In particular the P1 and P2 symbols carry L1 signaling information. The L1 signaling information is split into three main sections: the P1 signaling 410 (which is carried in the P1 symbol), L1-pre signaling 412 and L1-post signaling 414 (both carried in the P2 symbol). The L1 pre-signaling 412 enables the reception and decoding of the L1-post signaling 414, which in turn conveys the parameters needed by the receiver to access the physical layer pipes. The sub-carriers which are used to carry the L1-pre signaling information will be referred to herein as the L1-pre sub-carriers; and the sub-carriers which are used to carry the L1-post signaling information will be referred to herein as the L1-post sub-carriers.

All of the symbols, except the P1 symbol, (i.e. the P2 symbols, data symbols and frame closing symbol) comprise pilot cells. In particular, the P2 symbol comprises P2 pilots; the normal or data symbols comprise scattered, continual, and edge pilots; and any frame closing symbol comprises edge and frame-closing pilots. However, the P2 symbol comprises a higher number of pilots than the data symbols and frame closing symbols. As a result, a P2 symbol is considered to be a pilot-dense symbol.

The number, position and amplitude of the pilot cells in a P2 symbol are determined by the DVB-T2 mode. For example, in 32 k SISO (Single Input Single Output) mode, every $6^{th}$ cell is a P2 pilot and the amplification is $$\frac{\sqrt{37}}{5};$$

and in all other modes (including 32 k MISO (Multiple Input Single Output)) every $3^{rd}$ cell is a P2 pilot and the amplification is $$\frac{\sqrt{31}}{5}.$$

The higher number of pilots in a pilot-dense symbol, such as the P2 symbol, allows an estimate of the channel impulse response (CIR) to be made directly and solely from the pilots in the pilot-dense symbol. In particular, to sample a channel the frequency-axis sampling resolution has to be fine enough to capture the channel delay spread without aliasing. Only pilot-dense symbols have enough pilots to allow a high enough sampling resolution of pilots within a single symbol. In particular, in 8 MHz 32 k SISO the P2 symbol supports a Nyquist sampling for delay spreads up to $$\frac{T_u}{6} = 597 \ \mu s,$$

where $T_u$ is determined by the bandwidth and FFT size.

It is theoretically possible to estimate a channel impulse response from the pilots in a single data symbol, but it will have limited time resolution and will generally be noisy. To generate a useful channel impulse response from the pilots in the data symbols would require multiple data symbols to obtain enough pilot samples. For example, in some DVB-T2 modes it would take sixteen data symbols to obtain enough information to be able to estimate a useful channel impulse response. Accordingly, estimating the CIR from the pilots in a pilot-dense symbol allows the CIR to be estimated without reliance on the data symbols or elaborate decision-directed techniques based on data-bearing sub-carriers.

As noted above, the mis-positioning of the FFT window gives rise to total ISI (ICI+ISI). This can be shown mathematically where the received signal $\bar{s}(t, \tau)$ is represented as shown in equation (1):

$$\bar{s}(t, \tau) = \begin{cases} s(t+\tau) & \text{if } 0 \le t \le T-\tau \\ e(t-(T-\tau)) & \text{if } T-\tau \le t \le T \end{cases} \quad (1)$$

where $\tau$ is a positive FFT window position offset; T is the symbol duration; e(t) is the interference due to mis-positioning, translated by FFT positional shift and symbol duration; and s(t) is the wanted signal.

Performing a discrete Fourier transform (DFT) on the received signal results in a plurality of frequency domain bins $X_k$ that represent a particular sub-carrier or cell k as shown in equation (2). Manipulation of equation (2) illustrates that the frequency domain bin or cell can be represented as the desired cell signal, plus ICI and ISI (referred to as total ISI).

$$X_k = \frac{1}{T} \int_0^T \bar{s}(t, \tau) e^{-j2\pi f_k t} dt \quad (2)$$

$$X_k = \frac{1}{T} \int_0^{T-\tau} s(t+\tau) e^{-j2\pi f_k t} dt + \frac{1}{T} \int_{T-\tau}^T e(t-(T-\tau)) e^{-j2\pi f_k t} dt \quad (3)$$

$$X_k = \frac{1}{T} \int_\tau^T s(t) e^{-j2\pi f_k (t-\tau)} dt + \frac{1}{T} \int_T^{T+\tau} e(t-T) e^{-j2\pi f_k (t-\tau)} dt \quad (4)$$

$$X_k = \frac{1}{T} \int_0^T s(t) e^{-j2\pi f_k (t-\tau)} dt - \quad (5)$$
$$\frac{1}{T} \int_0^\tau s(t) e^{-j2\pi f_k (t-\tau)} dt + \frac{1}{T} \int_0^\tau e(t) e^{-j2\pi f_k (t-\tau)} dt$$

$$X_k = \frac{1}{T} \int_0^T s(t) e^{-j2\pi f_k (t-\tau)} dt - ICI_k(\tau) + ISI_k(\tau) \quad (6)$$

The frequency bin or cell can be re-written as a function of the FFT window position as shown in equations (7) and (8) where $S_k$ is the desired sub-carrier signal.

$$X_k(\tau) = S_k e^{j2\pi f_k \tau} + \frac{1}{T} \int_0^T [e(t) - s(t)] e^{-j2\pi f_k (t-\tau)} dt \quad (7)$$

$$X_k(\tau) = S_k e^{j2\pi f_k \tau} + ICI_k(\tau) + ISI_k(\tau) \quad (8)$$

Since $e^{j2\pi f_k \tau}$ is a rotation term that can be cancelled at the OFDM receiver, provided that the guard interval is greater than the channel extent, the term [e(t)−s(t)] can be nullified by the choice of $\tau$ such that the total ISI is eliminated or reduced.

If $S_k$ is a pilot of known amplitude and phase the channel impulse response (CIR) can be estimated. It is evident from equation (8) that the total ISI (ICI+ISI) will have a direct impact on the CIR, thus the total ISI (ICI+ISI) can be measured as a function of the window position, from the CIR, denoted CIR($\tau$).

Accordingly, if the CIR is determined for a plurality of different FFT window positions the noise floors of those CIRs indicate which of those FFT window positions has the least amount of total ISI.

Figure 5:
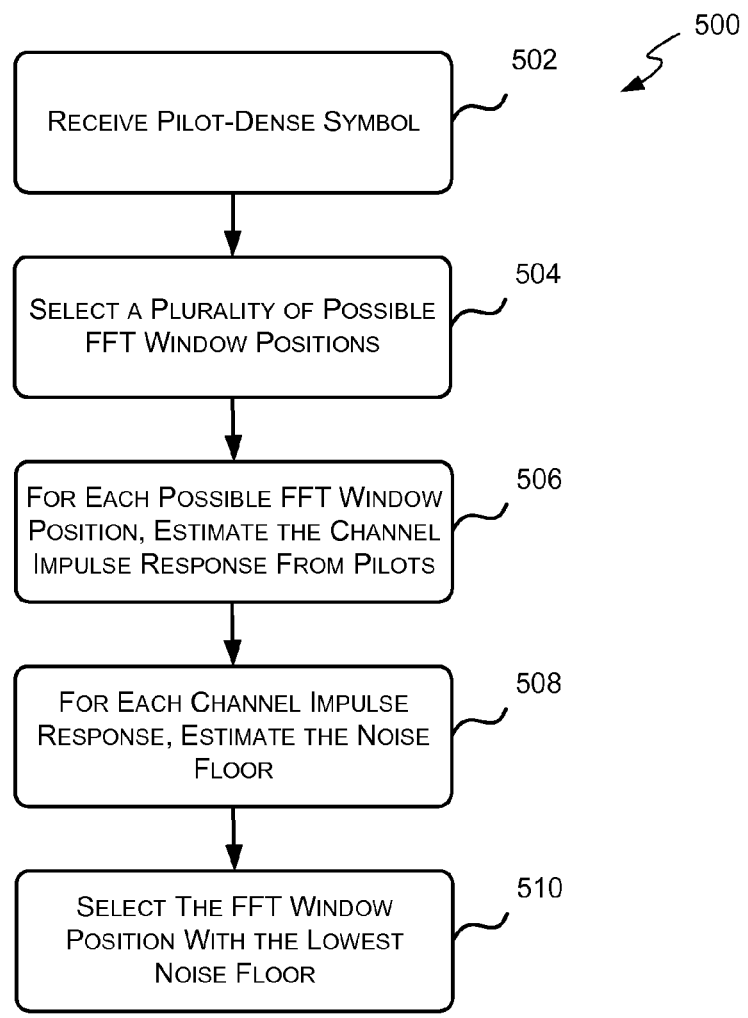
FIG. 5 is a flow chart of an example method for selecting an FFT window position for decoding symbols in an OFDM signal.

Reference is now made to FIG. 5 which illustrates a method 500 of selecting an FFT window for decoding symbols of a received OFDM signal by comparing channel impulse responses for various FFT window positions for a pilot-dense symbol (e.g. P2 symbol 406). The method 500 begins at block 502 where a pilot-dense symbol (e.g. P2 symbol 406) is received. In some cases the received pilot-dense symbol may be stored in a buffer. Once the pilot-dense symbol is received (and optionally stored) the method 500 proceeds to block 504.

At block 504 a plurality of possible or potential FFT window positions for decoding the received pilot-dense symbol are selected or identified. In one guard-agnostic formulation, the possible FFT window positions are selected by (i) estimating the start or first edge of the guard interval, (ii) identifying a plurality of FFT window positions that are shifted left from the estimated start or first edge of the guard interval; and (iii) identifying a plurality of FFT window positions that are shifted right from the estimated start or first edge of the guard interval.

Figure 6:
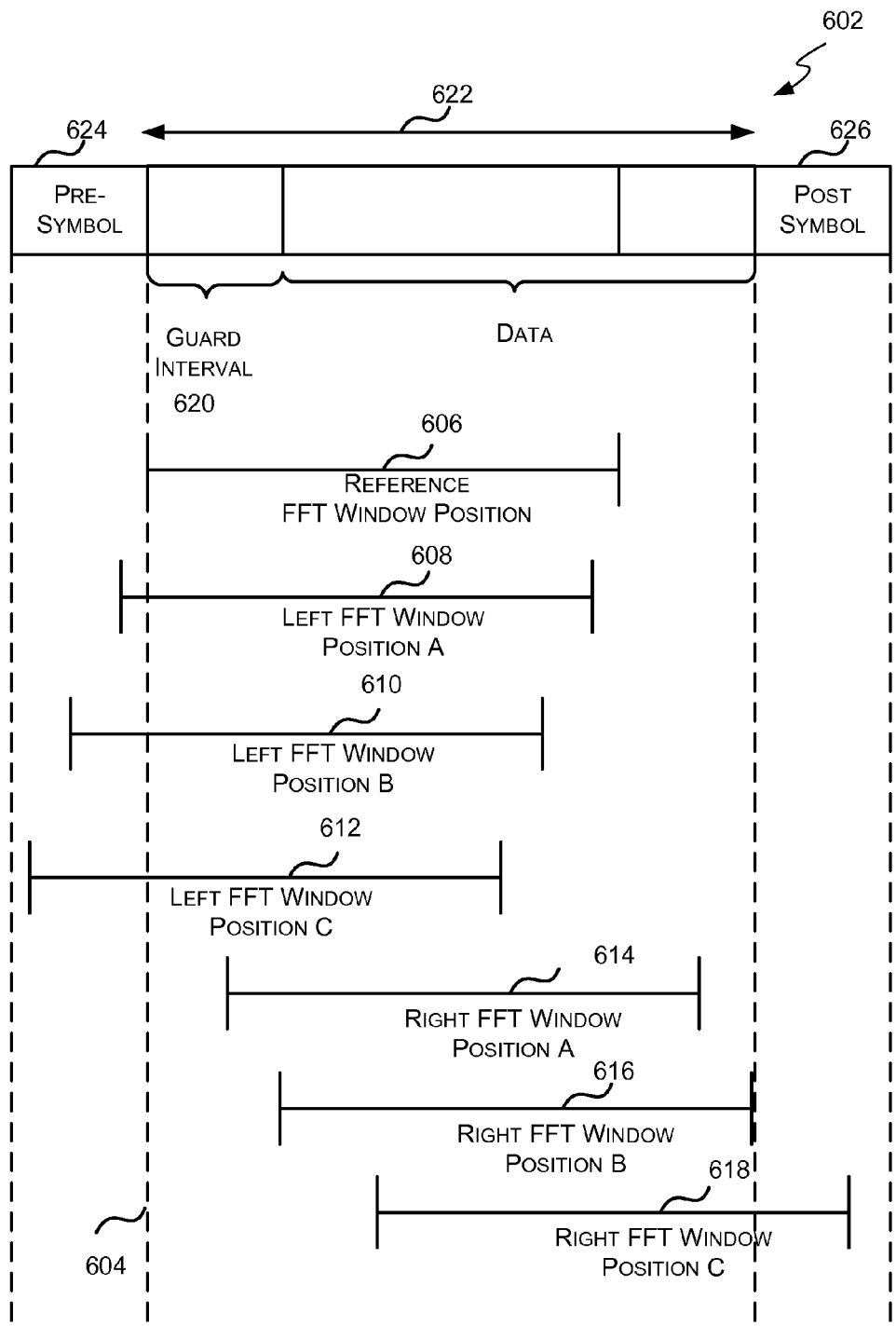
FIG. 6 is a schematic diagram illustrating a method for selecting potential FFT window positions for decoding a pilot-dense symbol.

For example, reference is now made to FIG. 6 which illustrates the selection of the possible or potential FFT window positions for decoding a received pilot-dense symbol 602. The start or first edge of the guard interval 620 is estimated to occur at point 604 and the first potential FFT window position is aligned with the estimated start or first edge of the guard interval. This first FFT window position may be referred to as the locked or reference FFT window position 606. A plurality of FFT window positions shifted left from the locked or reference FFT window position 606 are then selected (e.g. left FFT window position A 608; left FFT window position B 610; and left FFT window position C 612); and a plurality of FFT window positions shifted right from the locked or reference FFT window position 606 are then selected (e.g. right FFT window position A 614; right FFT window position B 616; and right FFT window position C 618).

At the time the selection of possible or potential FFT window positions is made, the OFDM receiver's confidence in its estimate of the guard interval 620 is not very high. To mitigate against this uncertainty, the left-right FFT window position selections may be anchored to a point that represents a best balance among all possible guard interval configurations: narrowest to widest. Such an arrangement is referred to as a guard-agnostic selection formulation.

In certain wireless channels (e.g. terrestrial), a weak echo can either precede or follow a much stronger main path. The echo can also be quite far from the main path (e.g. 5 times outside the guard interval) for certain configurations. It is, therefore, important that the FFT window selection be extended to the left and right beyond a typical symbol period 622 as denoted by pre-symbol period 624 (e.g. left FFT window positions A, B and C 608, 610 and 612) and post-symbol period 626 (e.g. right FFT window position C 618), respectively. It is evident to a person of skill in the art that the pre and/or post-symbol periods 624 and 626 can be configured in any way or fashion by higher-level logic.

In some cases the FFT window positions are selected so as to be equally spaced from each other. In other cases more FFT window positions are selected near the estimated or potential guard edges and fewer FFT window positions are selected farther from the estimated or potential guard edges. Selecting the potential FFT window positions in this manner can improve performance because, as described above, at the time the potential FFT window positions are selected the OFDM receiver is not confident that the transmitted guard interval 620 has been correctly identified. An example method of selecting a higher number of FFT window positions near the potential guard edges is described with reference to FIG. 11.

The number of potential FFT window positions that are selected may be based on the amount of memory available and the OFDM frame length. In particular, it takes a certain amount of time to evaluate each possible or potential FFT window position which is referred to herein as the noise floor scan. Thus the higher the number of points (possible or potential FFT window positions) used in the noise floor scan, the more time it takes to reach a result. Equally, it is advantageous to reduce the number of frames that elapse before the noise floor scan yields a result. This is because until a result is generated, the OFDM receiver cannot yet transition to a full demodulation, which adds to the latency of synchronization. Accordingly a balance has to be made between getting a quick result and getting an accurate result. For ease of storage and computation the number of potential FFT window positions selected is typically a multiple of two. In some examples, one hundred and ninety-two (192) FFT window positions are selected. However, it will be evident to a person of skill in the art that another number of FFT window positions may be used.

Once a potential or possible FFT window position has been selected, information identifying the selected FFT window position may be stored in memory. In some cases one point is stored for each selected FFT window position. For example, in some cases, the start position of each potential FFT window may be stored. In other cases, a shift value (a value representing the shift in time relative to the estimate guard start) may be stored.

Referring back to FIG. 5, once the plurality of potential FFT window positions have been selected the method 500 proceeds to block 506.

At block 506, for each potential FFT window position selected in block 504, an estimate of the channel impulse response (CIR) is determined from the pilots in the received pilot-dense symbol falling within the FFT window position. As described above, the number of pilots in a pilot-dense symbols allows an estimate of the CIR to be directly determined from the pilots. In some cases, estimating the channel impulse response for a particular FFT window position comprises performing a FFT on the pilot-dense symbol samples falling within the window defined by the particular FFT window position to generate a frequency domain representation of the pilot-dense symbol, extracting the pilots from the frequency domain representation of the pilot-dense symbol, and taking an IFFT of the extracted pilots to generate an estimate of the CIR. An example method for estimating the channel impulse response for a particular FFT window position is described with reference to FIG. 7. Once an estimate of the CIR has been determined for each of the possible FFT window positions, the method 500 proceeds to block 508.

At block 508, the noise floor of each CIR generated in block 506 is estimated. As described above, comparing the change in CIR noise floor as the FFT window position is shifted allows the presence of total ISI to be inferred. In particular, if the noise floor at shift m is denoted $n_{CIR}$, then $n_{CIR}$ is equal to the additive noise, $n_0$, which represents the lowest bound on noise after two DFT (discrete Fourier transform) projections (forward and inverse), and the noise due to total ISI, $n_{ISI}$, as shown in equation (9):

$$n_{CIR}(m)=n_0+n_{ISI}(m) \quad (9)$$

Given an appropriate channel coherence time under a worst case (slow-enough) fade regime, $n_0$ is assumed constant within the vicinity of the different window positions. An example method of determining the noise floor of a CIR is described with reference to FIG. 12.

Once the noise floor for the estimated CIRs has been estimated the method 500 proceeds to block 510.

At block 510 the FFT window position having the lowest CIR noise floor is selected as the optimum FFT window position for minimizing the total ISI. The optimum FFT window position may then be used to decode the symbols in the OFDM signal.

Although the estimation of the CIRs and associated noise floors in blocks 506 and 508 are described above as being executed sequentially for all of the potential FFT window positions (e.g. the CIR is estimated for each of the potential FFT window positions and then the noise floor is estimated for each of the estimated CIRs), in other examples the CIRs and associated noise floors may be determined in a different order. For example, in other cases the estimation of the CIR and corresponding noise floor is done in parallel for each possible or potential FFT window position (e.g. the CIR and corresponding noise floor are estimated for possible or potential FFT window position A, and in parallel, the CIR and corresponding noise floor are estimated for possible or potential FFT window position B). In yet other cases, the CIR and corresponding noise floor may be estimated for a particular FFT window position before the CIR and corresponding noise floor are estimated for the next FFT window position (e.g. the CIR and corresponding noise floor are estimated for possible or potential FFT window position A; then the CIR and corresponding noise floor are estimated for possible or potential FFT window position B).

Figure 7:
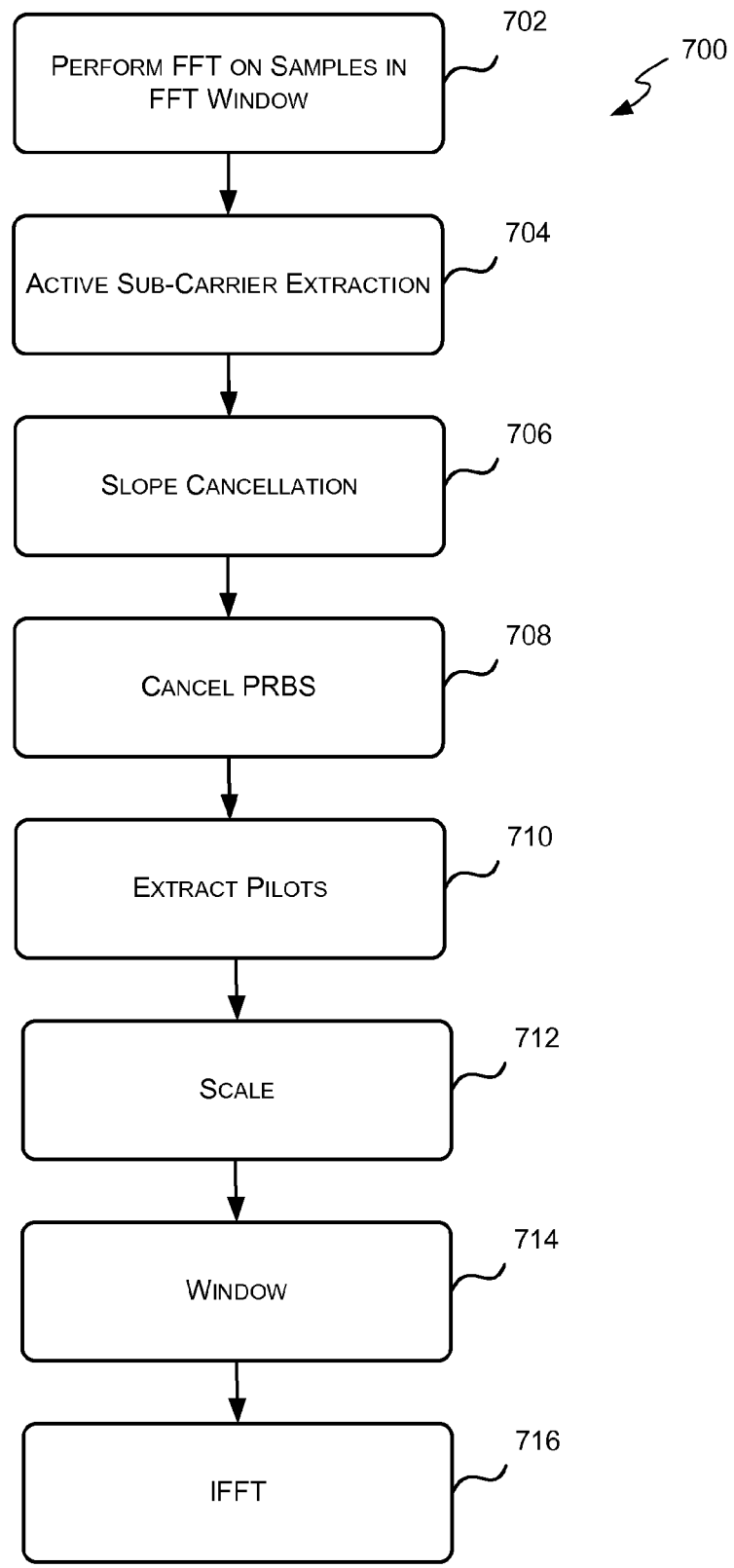
FIG. 7 is a flow chart of an example method of generating a channel impulse response for a specific FFT window position for a pilot-dense symbol.

Reference is now made to FIG. 7 which illustrates an example method 700 for estimating the channel impulse response (CIR) for a particular FFT window position from the pilots in a pilot-dense symbol. From an ISI perspective, the method 700 described herein leverages one forward and one inverse DFT kernels back-to-back to provide a distilled measure of the ISI-induced CIR noise floor which is easily separable. Consequently, ISI arising from very weak echoes (e.g. below 20 dB) can be robustly detected. This is in contrast with other methods such as time-domain, correlation-based methods.

The method 700 begins at block 702 where a forward FFT is performed on the samples that fall with the window defined by the particular FFT window position being evaluated. As is known to those of skill in the art an FFT converts a time domain representation of a signal into a frequency domain representation of the signal. Accordingly, the FFT receives the samples of the pilot-dense symbol falling within the FFT window and generates a frequency domain representation of those samples. Once the FFT has been performed and the frequency domain representation has been generated, the method 700 proceeds to block 704.

At block 704 the active sub-carriers are extracted from the frequency domain representation generated at block 702. In particular, as described above, in an OFDM system each cell of a symbol will be transmitted on a separate sub-carrier. However, not all of the possible sub-carriers are used. A number of the sub-carriers are reserved for "nulls" and lower and higher frequency guard carriers. The sub-carriers that are used to transmit data or information are referred to as the active sub-carriers. The sub-carriers that are not used to transmit data or information are referred to as the inactive sub-carriers.

Figure 8:
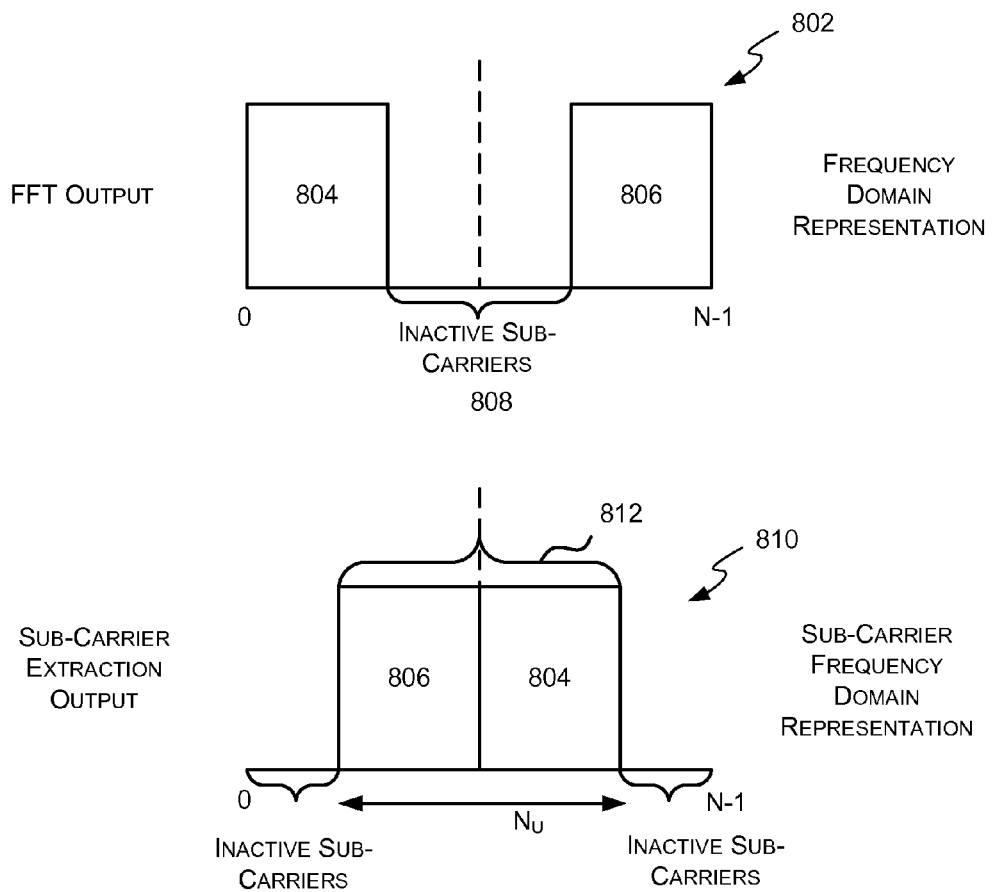
FIG. 8 is a schematic diagram illustrating an example method of extracting active sub-carriers from a frequency domain representation of a pilot-dense symbol.

Reference is now made to FIG. 8 which illustrates the distribution of active and inactive sub-carriers in the frequency domain. In particular, a FFT of size N will produce an FFT output (frequency domain representation 802) comprising a first group of active sub-carriers 804 separated from a second group of active sub-carriers 806 by a group of inactive sub-carriers 808. Since the inactive sub-carriers 808 do not carry any useful information they can be removed from the frequency domain representation 802, leaving only the active sub-carriers. This modified frequency domain representation will be referred to herein as the active sub-carrier frequency domain representation 810. Generating the active sub-carrier frequency domain representation 810 may comprise re-ordering the frequency domain representation 802 to make the active sub-carriers 806 and 804 a contiguous block 812 as shown in FIG. 8.

Referring back to FIG. 7, once the active sub-carriers have been extracted from the frequency domain representation generated at block 702, the method 700 proceeds to block 706.

At block 706, a slope cancellation is performed on the active sub-carrier frequency domain representation generated in block 704 to nullify the effect of the shift in time of the FFT window position relative to the locked or reference FFT window position. In particular, each possible FFT window position (other than the reference FFT window position itself) is time-shifted from the locked or reference FFT window position. If the time shift is not accounted for in the frequency domain then the CIRs corresponding to the different possible FFT window positions will be time shifted with respect to each other making it more difficult to accurately compare them.

Since a time shift corresponds to a change in the slope of the phase in the frequency domain, a time shift is nullified or discounted in the frequency domain by performing a phase slope cancellation. Accordingly, to nullify the time shift of the FFT window position a phase slope cancellation is performed on the active sub-carrier frequency domain representation to generate a slope cancelled active sub-carrier frequency domain representation. Performing the slope cancellation ensures that the CIR for each possible FFT window position remains at the same position in time regardless of the time shift in the FFT window position. This is important because, as described later with reference to FIG. 12, if the CIR is time shifted, when the CIR is decimated to estimate the noise floor, CIR samples may fall into the wrong bin.

Figure 9:
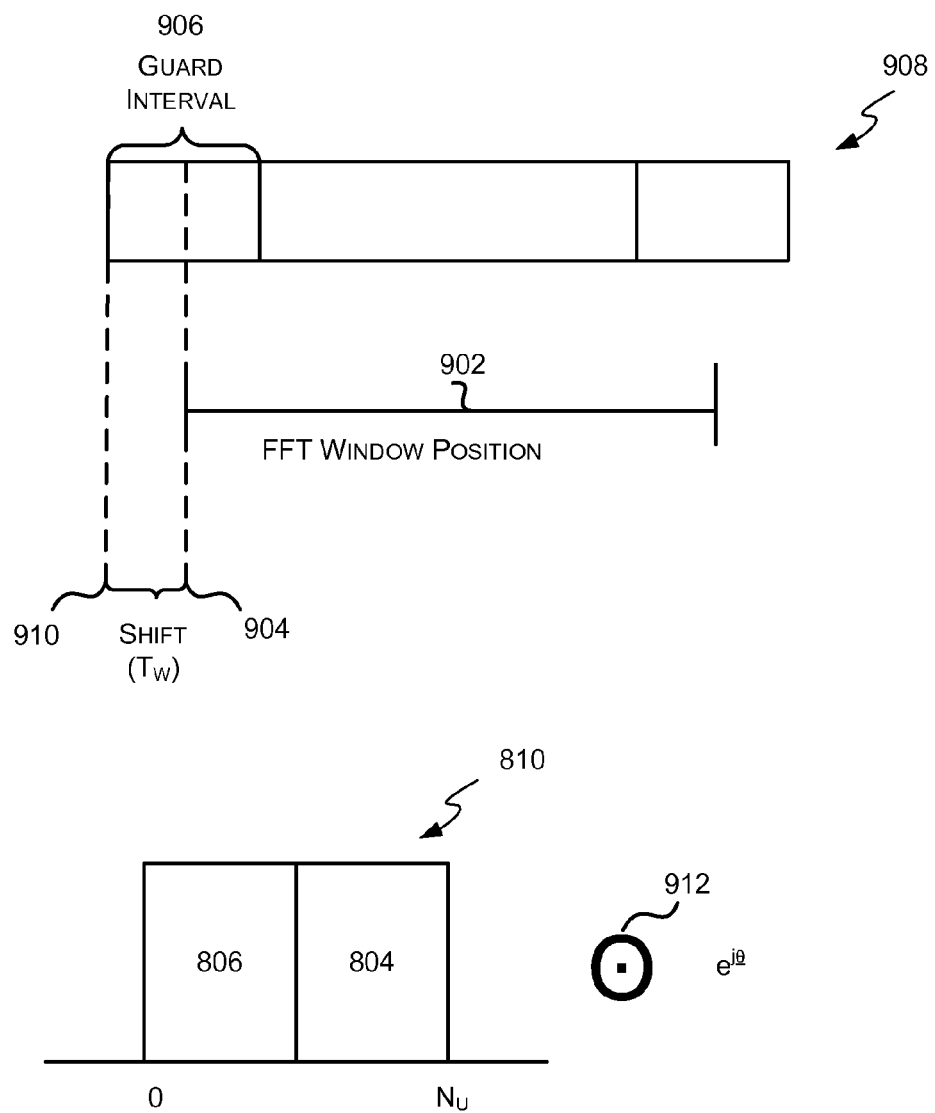
FIG. 9 is a schematic diagram illustrating an example method of performing slope cancellation on a frequency domain representation of a pilot-dense symbol.

Reference is now made to FIG. 9 which illustrates an example method for performing a phase slope cancellation for a particular FFT window position 902 which is shifted right from the estimated start or first edge 910 of the guard interval 906 for the received pilot-dense symbol 908. The amount of shift, $T_W$, is equal to the difference in time between the estimated start or first edge 910 of the guard interval 906 and the start or first edge 904 of the FFT window position 902.

In this example, the slope cancellation comprises performing an element-wise multiplication 912 between the active sub-carrier frequency domain representation 810 and a phase vector $\theta$ shown in equation (10) where $\theta_0$ is the phase offset, $\theta_t$ is the phase increment and $N_U$ is the number of active sub-carriers:

$$\underline{\theta}=\theta_0+[0,\ldots,N_U-1]\times\theta_t \quad (10)$$

The phase increment $\theta_t$ is equal to the shift $T_W$ divided by the size of the FFT, N, performed in block 702, as shown in equation (11):

$$\theta_t = \frac{T_W}{N} \cdot 2\pi \quad (11)$$

The phase offset $\theta_0$ is calculated in accordance with equation (12) where $\Delta$ is calculated in accordance with equation (13).

$$\theta_0 = (\Delta \cdot \theta_t) \quad (12)$$

$$\Delta = N - \frac{N_U - 1}{2} \quad (13)$$

Referring back to FIG. 7, once the phase slope cancellation has been performed, the method 700 proceeds to block 708.

At block 708, the PRBS (Pseudo-Random Binary Sequence) modulation is cancelled from the slope cancelled active sub-carrier frequency domain representation generated at block 706. Some OFDM systems may modulate the pilots according to a PRBS to avoid large peaks in the time-domain signal. For example, in DVB-T2, the pilots are BPSK (binary phase shift keying) modulated according to a reference sequence derived from a symbol-level PRBS and a frame-level PN-sequence. These sequences are known to the receiver and thus can be cancelled. The PRBS cancellation is performed on the slope cancelled active sub-carrier frequency domain representation generated at block 706 to generate a PRBS and slope cancelled active sub-carrier frequency domain representation. In some cases the cancellation is an element-wise multiplication of the pilots by the binary sequence to effectively demodulate their BPSK mapping. Once the PRBS modulation has been cancelled the method 700 proceeds to block 710.

At block 710, the pilots are extracted from the PRBS and slope cancelled active sub-carrier frequency domain representation generated at block 708. At this stage, various cancellation steps leave the pilots affected only by the channel, facilitating a direct estimation of the CIR. In some cases extracting the pilots may comprise locating the first pilot and then extracting each $X^{th}$ sample of the PRBS and slope-cancelled active sub-carrier frequency domain representation, where X is the repetition of the pilots in the pilot-dense symbol. For example, where every $6^{th}$ cell/sub-carrier is a pilot then every $6^{th}$ sample is extracted from the PRBS and slope cancelled frequency domain representation.

Figure 10:
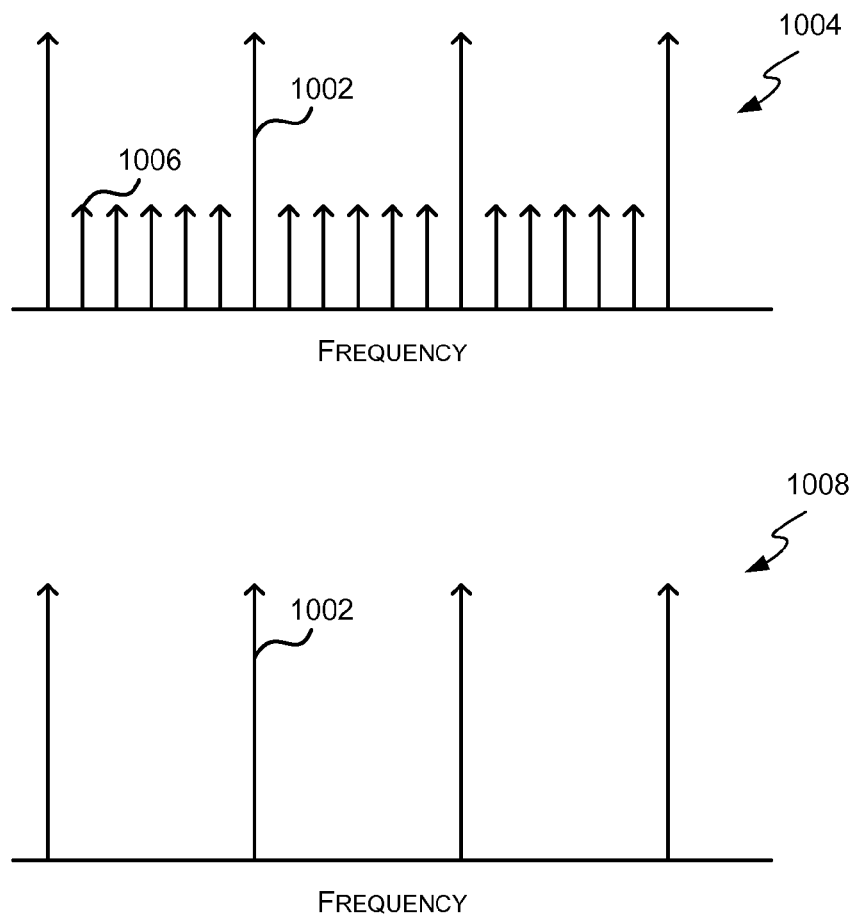
FIG. 10 is a schematic diagram illustrating an example method of extracting pilot sub-carriers from a frequency domain representation of a pilot-dense symbol.

Reference is now made to FIG. 10 which illustrates extraction of the pilot sub-carriers 1002 of a slope cancelled active sub-carrier frequency domain representation 1004. As described above the pilot sub-carriers 1002 are boosted as compared to the non-pilot or regular sub-carriers 1006. In the example shown in FIG. 10 every $6^{th}$ active sub-carrier is a pilot sub-carrier 1002. Extracting the sub-pilots results in a pilot frequency domain representation 1008 that comprises only the pilot sub-carriers 1002.

Referring back to FIG. 7, once the pilot frequency domain representation has been generated, the method 700 proceeds to block 712.

At block 712, the pilot frequency domain representation generated at block 710 is scaled or amplified to be at a certain level to maximize the dynamic range of the IFFT module used in block 716. In some examples, the scale or amplification is determined from the locked or reference FFT window position and then the same scale is applied to the pilot frequency domain representation for each other possible or potential FFT window position being evaluated. The scale or amplification may be selected by determining the normalized power of the pilot-dense symbol signal as defined by the locked or reference FFT window position and identifying a scale or amplification value to apply to the signal to place it at a certain level to maximize the dynamic range of the IFFT module. This produces a more accurate CIR and thus allows the noise floor of the CIR to be more accurately measured. Once the pilot frequency domain representation has been scaled or amplified to generate a scaled pilot frequency domain representation, the method 700 proceeds to block 714.

At block 714, the scaled pilot frequency domain representation generated at block 712 is windowed to generate a windowed and scaled pilot frequency domain representation. In other words a window function is applied to the scaled pilot frequency domain representation. The window function may serve a dual purpose. Firstly the window function may select a subset (e.g. a radix-2 subset) of all available pilots such that the IFFT can be taken directly. For example, where an IFFT of size 5,000 is used, the window may be used to drop the number of samples to around 4,096 which has shown to still produce a reliable result.

In some cases the window function is applied so that the samples closer to the center bandwidth (the center of the symbol) are selected or taken and the samples at the edges are not selected (e.g. windowed out). This is because the samples at the center are likely to be of better fidelity (e.g. free of adjacent channel interference).

Secondly, the window function may also apply a smoothing function in order to combat the spectral leakage resulting from the finite pilot set. As such, the accuracy of the noise floor estimation may be further enhanced. Where sidelobe rejection is of importance, a classic Hamming window may be utilized for its excellent 40 dB sidelobe rejection and ease of implementation on resource-constraint hardware. Once the scaled pilot frequency domain representation has been windowed, the method 700 proceeds to block 716.

At block 716, an IFFT is taken of the windowed and scaled pilot frequency domain representation generated at block 714 to generate a CIR for the particular FFT window position being evaluated. As known to those of skill in the art an IFFT converts a frequency domain representation of a signal into a time domain representation of the signal. As described above an accurate CIR can be obtained directly from the pilots in the pilot-dense symbol thus performing an IFFT of the windowed and scaled pilot frequency domain representation produces an accurate CIR for the particular FFT window position being evaluated.

Figure 11:
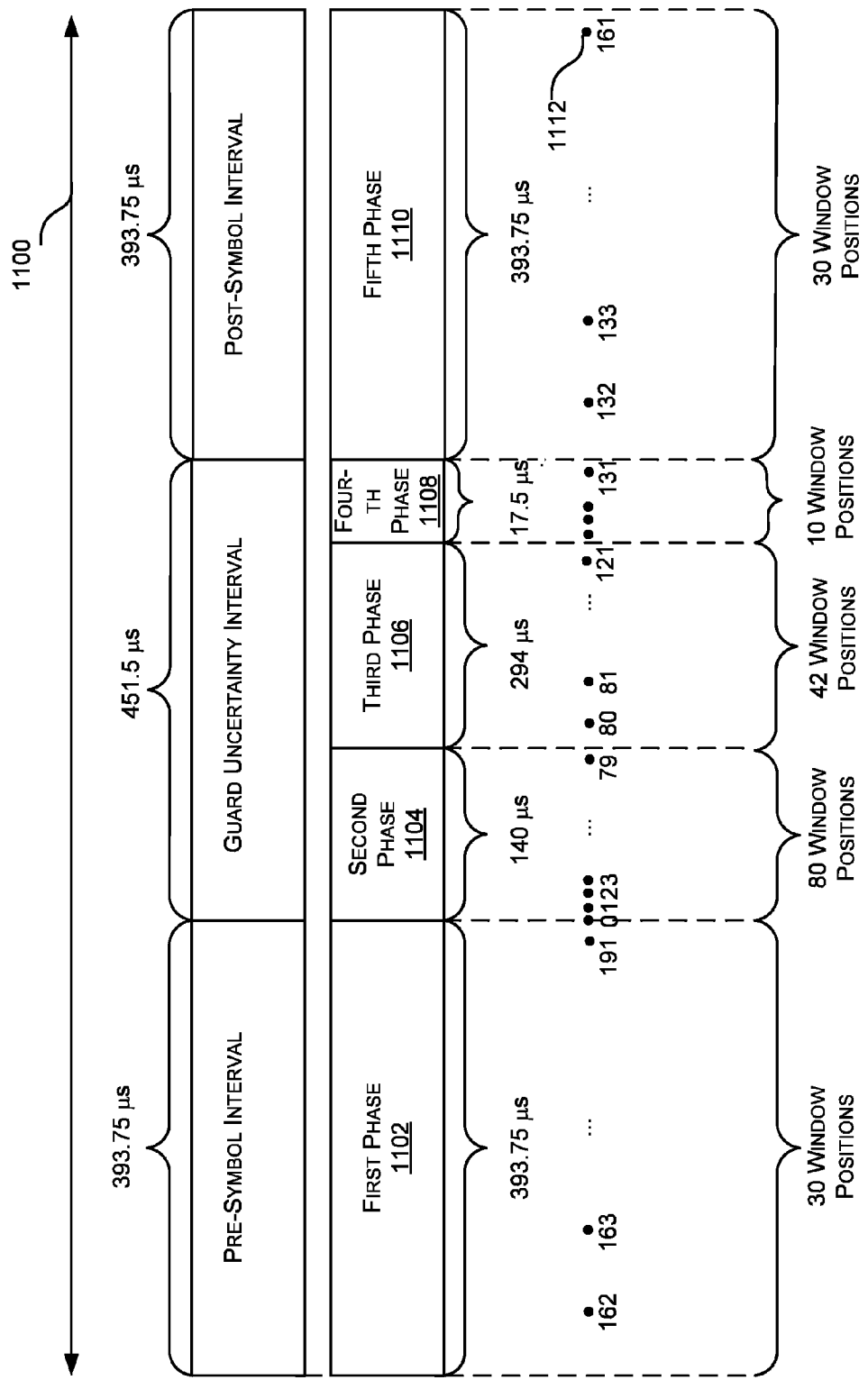
FIG. 11 is schematic diagram of an example method of selecting potential FFT window positions that are centered around the guard interval edges.

As described above, an improvement in accuracy may be achieved by selecting and evaluating more FFT window positions near the estimated guard interval edges and fewer FFT window positions farther away from the estimated guard interval edges. Reference is now made to FIG. 11 which illustrates an example of how the potential FFT window positions can be selected for maximal efficacy. In this example, the period 1100 over which FFT window positions are selected is divided into five different phases 1102, 1104, 1106, 1108 and 1110. The phases 1102, 1104, 1106, 1108 and 1110 vary in the density or ratio of FFT window position selections (i.e. some phases have a higher density of selected window position than other phases). In this particular example, the configuration of the phases is designed to combat parameter uncertainties at acquire-time such as guard period or wide, outside-guard echoes.

In the example of FIG. 11, the OFDM signal is a DVB-T2 signal configured for an 8 MHz channel, 32 k and $\frac{1}{128}$ guard interval. Accordingly, the guard interval is 28 μs or 256 baseband samples. In a narrow guard terrestrial broadcast, it is not uncommon to experience echoes which span significantly more than the guard duration. Superimposed on this is the fact that the echo can precede or follow the much stronger main path. In addressing this, the second phase 1104, which is 5×28 μs=140 μs, has a high density of FFT window position selections 1112. The second phase 1104 is designed to select the correct FFT window position with fine resolution for an echo outside the guard interval up to 5 times the guard interval.

Simultaneously, the OFDM receiver could have mis-estimated the $\frac{1}{128}$ guard at acquire-time when in fact the transmitted guard was $\frac{1}{8}$=448 μs. Because of this uncertainty, the fourth phase 1108 returns back to having a high density of FFT window position selections after an intermediate third phase 1106 of medium-density FFT window position selections such that the guard edge of a 448 μs guard is catered for. The first and fifth phases 1102 and 1110 have a low density of FFT window positions reflecting the unlikelihood of encountering significant echoes.

In FIG. 11, a total of one hundred ninety-two (192) potential FFT window positions are selected. This equates to 1239 μs at the 8 MHz example, which is a sizeable portion of the ~3.6 ms 32 k mode symbol. Many other divisions of selected FFT window position configurations are possible and the non-uniform FFT window position selection could be arbitrarily made complex, defined programmatically, and adapted and configured by higher-level applications.

Figure 12:
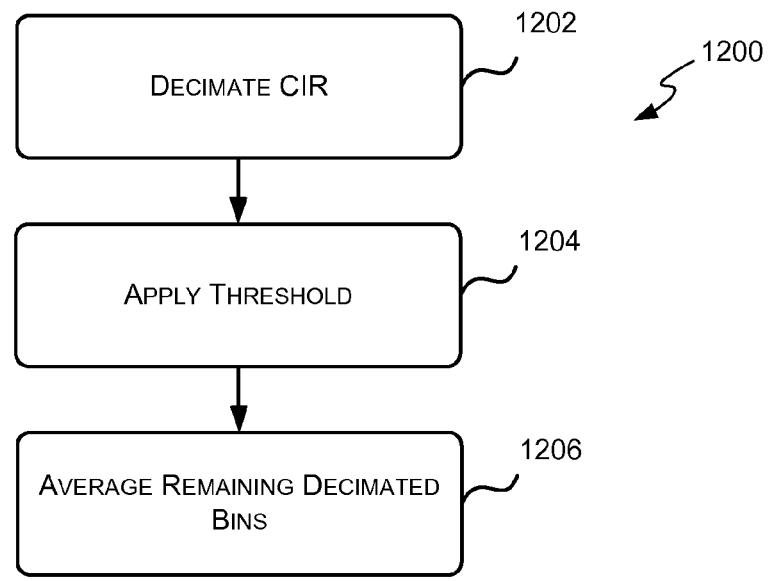
FIG. 12 is flow chart of an example method of determining the noise level of a channel impulse response.

Reference is now made to FIG. 12 which illustrates an example method 1200 of estimating the noise level of a CIR for a particular FFT window position. The method 1200 begins at block 1202 where the CIR is decimated into a number of bins to produce a decimated CIR. As is known to those of skill in the art decimation is the process of dividing a number of samples into groups (or bins) and then storing only one sample or value to represent the group. In some cases the one value for each group or bin may be the average of the values in that bin. The CIR typically comprises thousands of samples and decimation reduces the number of samples significantly to a more amenable number for analysis. For example, in some cases, there may be 4,096 samples in the CIR which are decimated to 128 samples (i.e. bins). The number of bins may be selected to achieve the best trade-off between resolution and analysis complexity. Once the CIR has been decimated the method 1200 proceeds to block 1204.

At block 1204, a threshold is applied to the decimated CIR to eliminate the bins or samples that are above the threshold. The threshold is selected to eliminate energy peaks that can be attributed to the symbol itself such that only the noise remains. In some cases, the threshold is selected to be a predetermined value (e.g. −12 dB) from the maximum bin of the decimated CIR. However, it will be evident to a person of skill in the art that the threshold may be selected using other methods or procedures. In some cases the threshold is selected only once. For example, the threshold may be selected based on the maximum bin of the decimated CIR for the reference or locked FFT window position. Once the threshold has been applied to the decimated CIR the method 1200 proceeds to block 1206.

At block 1206 the bins remaining after the threshold has been applied to the decimated CIR are combined (e.g. summed or averaged) to produce a representation of the noise floor of the CIR. In general, the higher the combination (e.g. sum or average), the more noise. Inherently, the more of the power is attributed to the noise, the less power is attributed to the symbol. Accordingly, more power will be attributed to the symbols (and thus ISI is reduced) by using the FFT window position with the lowest noise floor to decode the OFDM symbols.

Figure 13:
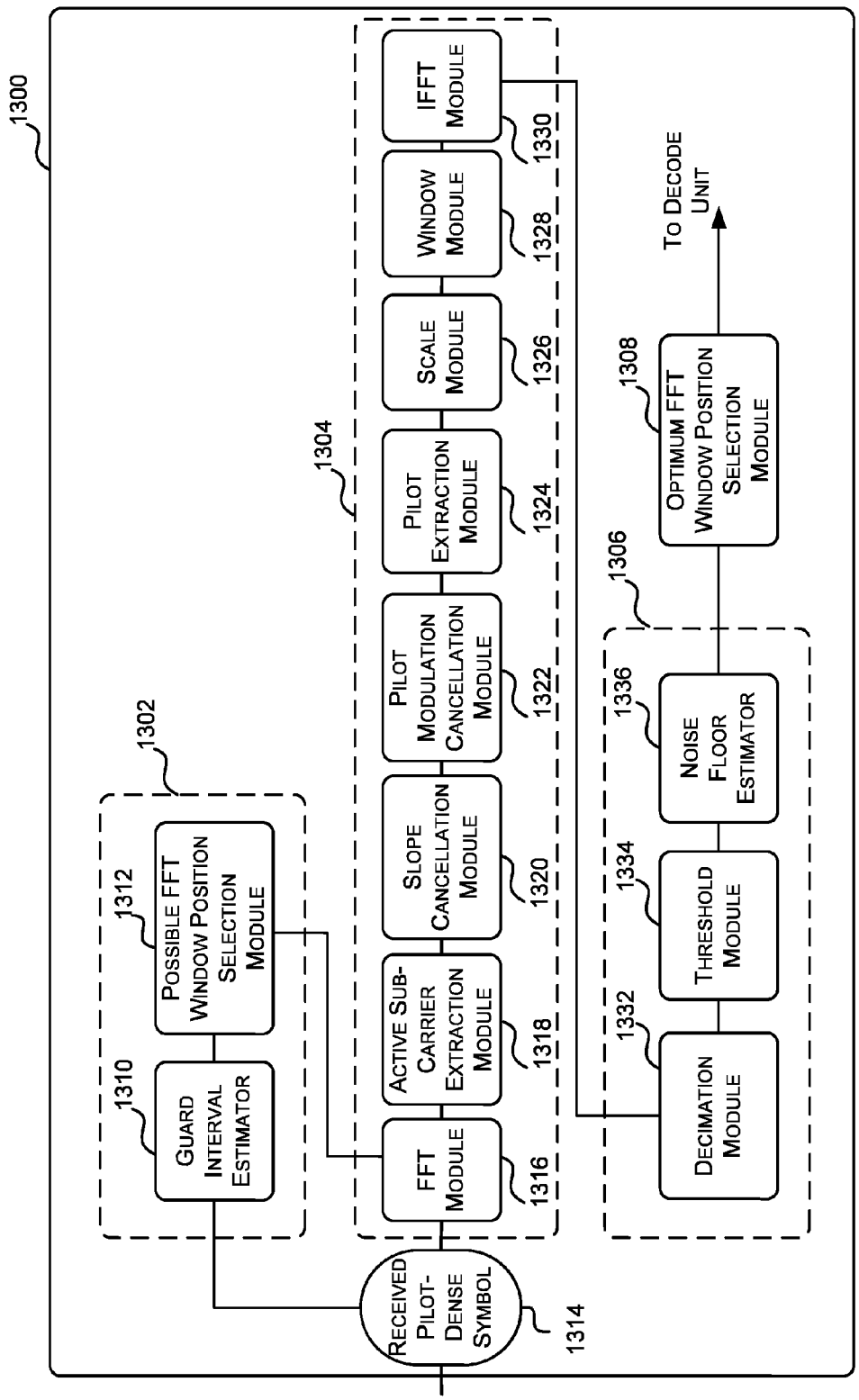
FIG. 13 is a block diagram of an example OFDM receiver for implementing the method of FIG. 5.

Reference is now made to FIG. 13 which illustrates an example OFDM receiver 1300 for selecting an FFT window position in accordance with the methods described above. The OFDM receiver 1300 comprises four main modules—a potential FFT window position generation module 1302 configured to generate the plurality of possible or potential FFT window positions based on one or more system configurations (e.g. FFT mode, guard interval (GI) etc.); a channel impulse response generation module 1304 configured to generate a channel impulse response for each possible or potential FFT window position generated by the potential FFT window position generation module 1302; a noise floor estimation module 1306 configured to estimate the noise floor for each of the channel impulse responses generated by the channel impulse response generation module 1304; and an optimum FFT window position selection module 1308 configured to select the potential FFT window position with the lowest noise floor as the optimum FFT window position for minimizing total ISI. The optimum FFT window position can then be provided to a decode unit (not shown) for decoding the symbols of the OFDM signal.

In the example shown in FIG. 13, the potential FFT window position generation module 1302 comprises a guard interval estimator 1310 and a possible FFT window position selection module 1312. The guard interval estimator 1310 receives the received pilot-dense symbol 1314 and estimates the guard interval. The guard interval may be estimated using any known techniques, such as, but not limited to, a correlation-based search method. Once the guard interval has been estimated the possible FFT window position selection module 1312 selects a number of FFT window positions that are shifted left and right from the start of the estimated guard interval as described above with reference to FIGS. 5, 6 and 11. For example, as described above, the FFT window positions may be selected so they are equally spaced over the symbol period (including a pre and post symbol interval) or they may be selected so that more potential FFT window positions are selected near the estimated guard interval edges and fewer potential FFT window positions are selected farther away from the estimated guard interval edges.

As described above, the channel impulse response generation module 1304 is configured to generate or estimate a channel impulse response for each possible or potential FFT window position generated by the potential FFT window position generation module 1302. In general, for each possible or potential FFT window position, the channel impulse response generation module 1304 takes the FFT of the received pilot-dense symbol 1314 samples that fall within the window defined by the possible or potential FFT window position being evaluated to generate a frequency domain representation of the pilot-dense symbol; extracts the pilot sub-carriers from the frequency domain representation; and takes the IFFT of the extracted pilot sub-carrier frequency domain representation to generate an estimate of the channel impulse response for that possible or potential FFT window position.

In the example shown in FIG. 13, the channel impulse response generation module 1304 comprises an FFT module 1316, an active sub-carrier extraction module 1318, a slope cancellation module 1320, a pilot modulation cancellation module 1322, a pilot extraction module 1324, a scale module 1326, a window module 1328, and an IFFT module 1330. The FFT module 1316 receives information from the potential FFT window position generation module 1302 identifying the position of a particular FFT window, and the received pilot-dense symbol 1314, and takes the FFT of the samples of the received pilot-dense symbol 1314 that fall within the window at the identified position to generate a frequency domain representation of the pilot-dense symbol. The active sub-carrier extraction module 1318 then extracts the active sub-carriers from the frequency domain representation of the pilot-dense symbol using any suitable means, such as, but not limited to, those described above with reference to FIGS. 7 and 8. For example, as described above, the active sub-carriers may be extracted by re-arranging the frequency domain representation so that the active sub-carriers form a contiguous block.

The active sub-carrier frequency domain representation generated by the active sub-carrier extraction module 1318 is then provided to a slope cancellation module 1320. As described above, each possible or potential FFT window position is time shifted with respect to the reference or locked FFT window position. To eliminate the effect of the time shift in the calculations the slope cancellation module 1320 applies a phase slope cancellation to the active sub-carrier frequency domain representation. Any suitable method may be used to apply a phase slope cancellation to the active sub-carrier frequency domain representation such as, but not limited to, those described above with reference to FIGS. 7 and 9.

The slope cancelled active sub-carrier frequency domain representation generated by the slope cancellation module 1320 is supplied to a pilot modulation cancellation module 1322. As described above some OFDM systems may modulate the pilots according to a PRBS to mitigate against high peaks in the time-domain envelope. For example, in DVB-T2, the pilots are BPSK modulated according to a reference sequence derived from a symbol-level PRBS and a frame-level PN-sequence. The pilot modulation cancellation module 1322 cancels or demodulates the modulation of the pilots.

The de-modulated and slope cancelled active sub-carrier frequency domain representation generated by the pilot modulation cancellation module 1322 is provided to a pilot extraction module 1324 configured to extract the pilots from the de-modulated and slope cancelled active sub-carrier frequency domain representation to generate a pilot frequency domain representation. The pilots may be extracted using any suitable method, such as, but not limited, to those described above with reference to FIGS. 7 and 10.

The pilot frequency domain representation generated by the pilot extraction module 1324 is provided to a scale module 1326 configured to scale or amplify the pilot frequency domain representation to a certain level to maximize the dynamic range of the IFFT module 1330. As described above, the scale or amplification to be applied by the scale module 1326 may be determined once from the locked or reference FFT window position and then that scale is applied to the pilot frequency domain representation for each other possible FFT window position.

The scaled pilot frequency domain representation generated by the scale module 1326 is provided to the window module 1328 which is configured to apply a window function to the scaled pilot frequency domain representation. As described above, a window function applies a zero function to samples that fall outside a defined window. In some cases the window function may also perform a smoothing function. Any suitable window function, such as, but not limited to, those described with respect to FIG. 7, may be used.

The windowed and scaled pilot frequency domain representation generated by the window module 1328 is provided to an IFFT module 1330 which is configured to generate a channel impulse response (CIR) for the particular FFT window position being evaluated. In particular, the IFFT converts the frequency domain representation into a time domain representation. Since the frequency domain representation received by the IFFT module 1330 represents the pilots in the frequency domain the corresponding time domain representation provides an estimation of the CIR for the particular FFT window position.

As described above, the noise floor estimation module 1306 is configured to estimate the noise floor for each of the channel impulse responses generated by the channel impulse response generation module 1304. In the example of FIG. 13, the noise floor estimation module 1306 comprises a decimation module 1332, a threshold module 1334 and a noise floor estimator 1336.

The decimation module 1332 is configured to receive the CIRs generated by the channel impulse response generation module 1304 and for each CIR decimate the CIR into a number of bins to produce a decimated CIR. In particular, a CIR will typically comprise thousands of samples and the decimation reduces the number of sample to a more amendable number for analysis. The decimation may be performed using any suitable method, such as, but limited to, those described above with reference to FIG. 12. For example, in some cases decimation may comprise dividing the samples into block of X samples and representing each block by a single value which may be, for example, a sum or average.

The decimated CIR generated by the decimation module 1332 is provided to a threshold module 1334 configured to apply a threshold to the decimated CIR to eliminate the bins or samples that are above the threshold. As described above with reference to FIG. 12 the threshold is selected to eliminate energy peaks that can be attributed to the symbol itself such that only the noise remains. The threshold may be selected using any suitable method, such as, but not limited to, the methods described above with reference to FIG. 12.

The thresholded and decimated CIR generated by the threshold module 1334 is provided to the noise floor estimator 1336 which is configured to combine (e.g. sum or average) the bins or samples remaining after the threshold has been applied to the decimated CIR to produce a representation of the noise floor of the CIR.

As described above, the optimum FFT window position selection module 1308 receives the noise floor estimates generated by the noise floor estimation module 1306 and selects the potential FFT window position with the lowest noise floor as the optimum FFT window position for minimizing ISI. The optimum FFT window position can then be provided to a decode unit (not shown) for decoding the symbols in the OFDM signal.

Further, the decoder 1300 described in FIG. 13 may also report additional parametric hints to the subsequent demodulator in order to aid performance. For instance, it has been identified that the depth of the CIR noise floor curve—i.e. the difference between the minimum and maximum values of the CIR noise floor curve (e.g. CIR noise floor curve 1706 or CIR noise floor curve 1712 of FIG. 17)—is correlated with the wireless channel's C/N. This can be intuitively seen when considering the model in equation (8), which can be extended with a C/N-dependent term W(C/N) noting the linearity of the Fourier operator. At acquire-time, by passing the C/N parametric hint of the noise floor depth onto the demodulator, the demodulator can have a reliable indicator of the channel's C/N which enables the adaptation of certain tracking parameters (e.g. channel estimate truncation threshold) such that performance may be maximized when encountering, for example, high noise conditions.

In addition to using the identified FFT window position to reduce ISI, the identified FFT window position can also be used to perform channel centering. The term "channel centering" is used herein to describe the correct identification of path positions within the channel. Channel centering ensures that the CIR can be optimally positioned, or centered, prior to the across-frequency filtering and interpolation of the pilots for the purposes of successful channel estimation. In a multipath channel, particularly in the presence of low level pre-echo (e.g. less than 15 dB) that is not initially detected by acquire time correlation based methods, there can be ambiguity in the true path positions of the channel impulse response.

Figure 14:
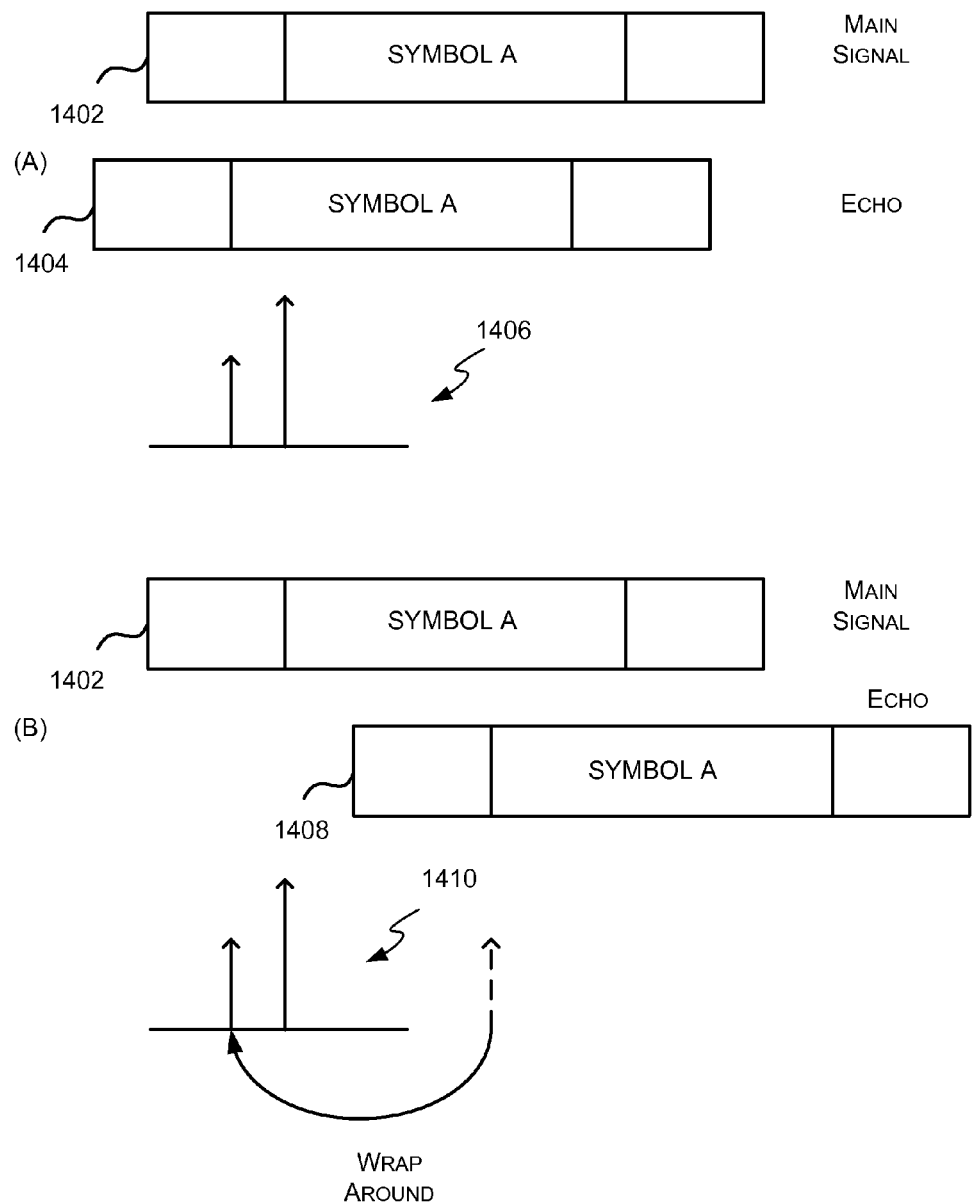
FIG. 14 is a schematic diagram illustrating channel impulse response path position ambiguity.
Figure 15:
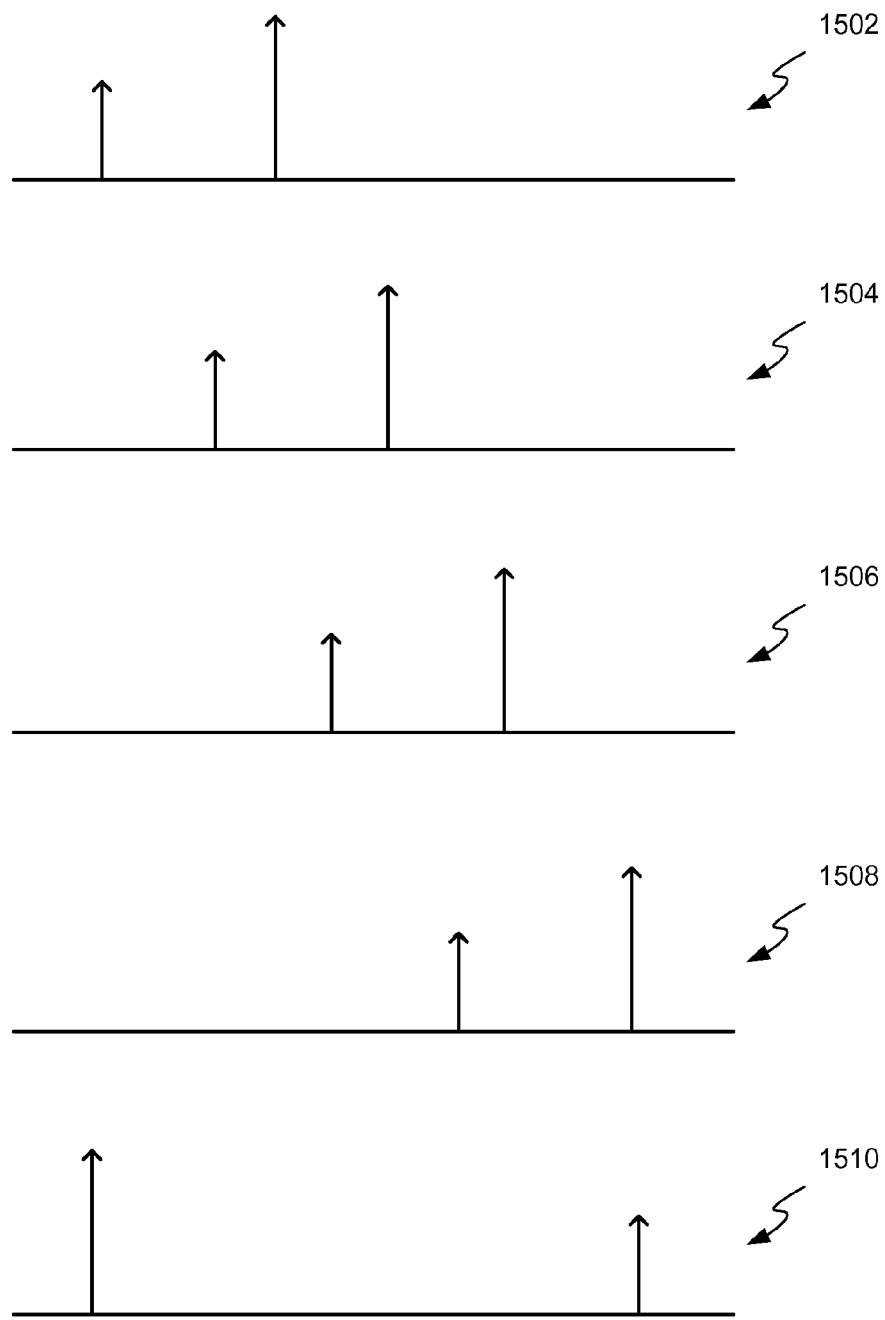
FIG. 15 is a schematic diagram illustrating a number of time-shifted or rotated channel impulse responses.

Reference is now made to FIGS. 14 and 15 to illustrate this ambiguity and explain the concept of channel centering. In particular, (A) of FIG. 14 illustrates a main signal 1402 and a weak pre-echo 1404 that both comprise symbol A. This channel would have a CIR 1406. In contrast (B) of FIG. 14 illustrates the main signal 1402 and a weak post-echo 1408. This channel would have an identical CIR 1410 to the CIR 1406 in (A) because the post echo delay in (B) of FIG. 14 has extended beyond the Nyquist limit of the CIR and wrapped around to appear in front of the main path. Accordingly it is not immediately evident from the analysis of the CIRs 1406 or 1410 of FIG. 15 whether the echo 1408 preceded the main signal 1402 as shown in (A) of FIG. 14 or whether the echo 1404 follows the main signal 1402 as shown in (B) of FIG. 14. It is important to identify the correct center or configuration of the channel impulse response to allow equalization to be effective.

The correct path positions, or center, for the CIR can be determined by applying a plurality of different time shifts or rotations to the pilots in the pilot-dense symbol (defined by the FFT window identified using the methods and systems described above) to generate possible path positions within the channel. A channel frequency response estimate is then generated for each possible path position and used to equalize the pilot dense symbol. The path position (time shift/rotation) corresponding to the equalized pilot dense symbol with the lowest noise on the L1-pre sub-carriers is then selected as the correct path position.

As described above in reference to FIG. 4, the P2 symbols carry L1 signaling information. The L1 signaling information is split into three main sections: the P1 signaling (which is carried in the P1 symbol) and L1-pre signaling and L1-post signaling (both carried in the P2 symbol). The L1-pre signaling enables the reception and decoding of the L1-post signaling, which in turn conveys the parameters needed by the receiver to access the physical layer pipes. The sub-carriers which are used to carry the L1-pre signaling information are referred to herein as the L1-pre sub-carriers. Since the L1-pre sub-carriers will be equalized by a correct channel frequency response, if an incorrect path position has been used to generate the channel frequency response estimate then the L1-pre sub-carriers will not be properly equalized (i.e. noisy). Furthermore, the noise on the L1-pre sub-carriers is measured instead of the noise on the L1-post sub-carriers because the encoding scheme for the L1-pre sub-carriers is known. In particular the L1-pre sub-carriers are always BPSK encoded, whereas L1-post sub-carriers may be BPSK, QPSK, 16QAM or 64QAM encoded and the specific encoding scheme used for the L1-post sub-carriers is not yet known.

Reference is now made to FIG. 15 which illustrates a plurality of different time shifts of the channel impulse response 1502, 1504, 1506, 1508, and 1510 which may be evaluated. If the channel was as illustrated in (B) of FIG. 14 with a weak post-echo, then the CIR 1510 would be identified as showing the correct path positions. If, however, the channel was as illustrated in (A) of FIG. 14 with a weak pre-echo, then CIRs 1502, 1504, 1506 or 1508 would be identified as showing the correct path positions. The time shift producing the least amount of noise on the L1-pre sub-subcarriers may then be selected as the time shift to be used in decoding the OFDM signal. It will be evident to a person of skill in the art that the examples shown in FIGS. 14 and 15 are very simple and or only meant to illustrate the concepts. A person of skill in the art will understand that they do not reflect the bewildering complexity of real-life channels that typically have many echoes.

Figure 16:
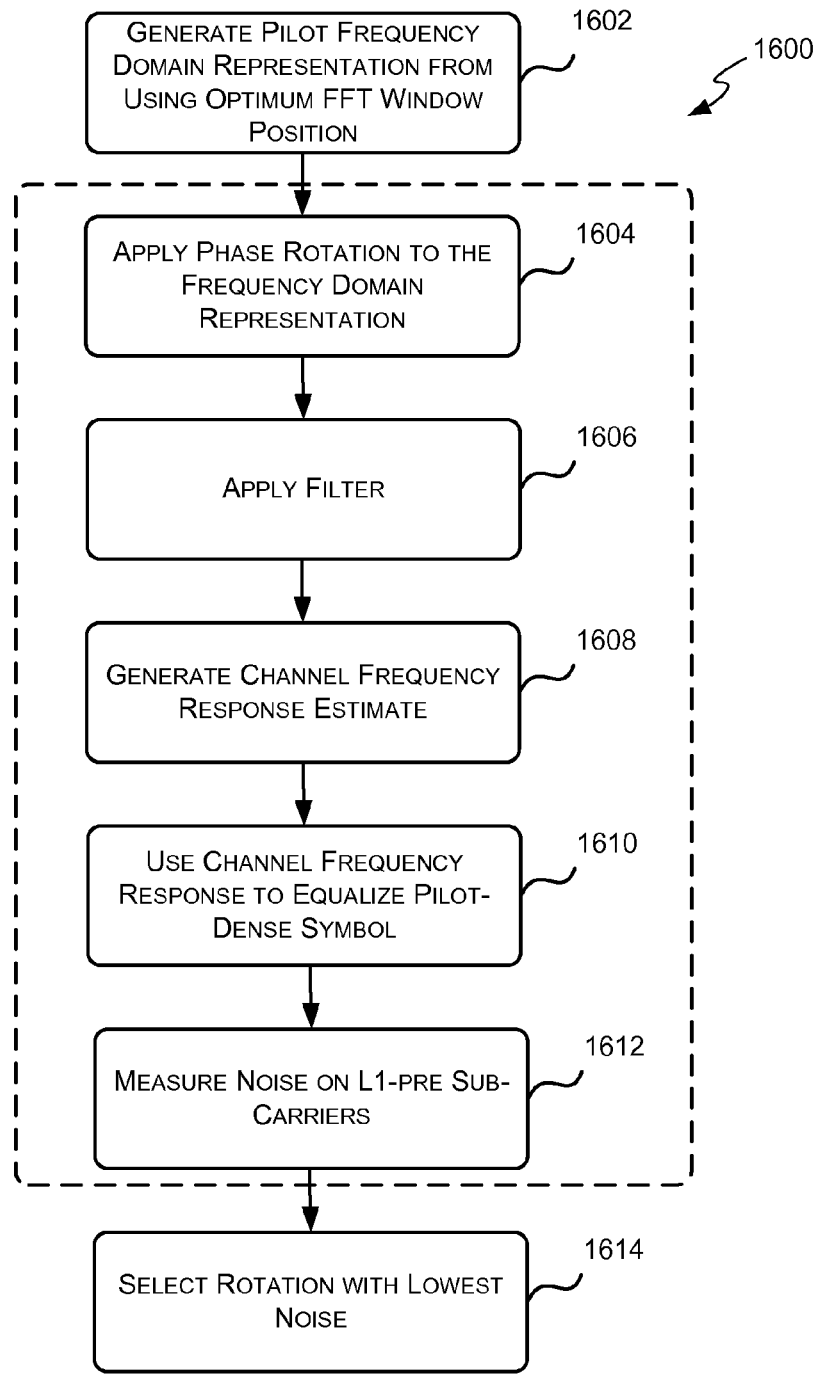
FIG. 16 is a flow chart of an example method for identifying the center of a channel impulse response.

Reference is now made to FIG. 16 which illustrates a method 1600 for determining the correct path positions of the channel impulse response for the FFT window position identified using the methods and systems described herein. The method 1600 begins at block 1602 where a frequency domain representation of the pilots in the identified FFT window position is generated. This may comprise, as described above, taking the FFT of the samples of the pilot-dense symbol that fall within the window defined by the identified FFT window position and extracting the pilot sub-carriers. Once the pilot frequency domain representation is generated the method 1600 proceeds to block 1604

At block 1604, a phase rotation is applied to the pilot frequency domain representation generated at block 1602. As described above with reference to FIG. 7, a time shift is represented by a phase rotation in the frequency domain. Accordingly, applying a phase rotation implements a time shift to the pilot time domain representation. Once the phase rotation has been applied, the method 1600 proceeds to block 1606.

At block 1606 a filter is applied to the phase rotated pilot frequency domain representation generated at block 1604 to reduce the noise on the pilots and improve the quality of the channel estimate. In some examples the filter is a low pass finite impulse response (FIR) filter. Once the filter has been applied to the phase rotated pilot frequency domain representation, the method 1600 proceeds to block 1608.

At block 1608, a channel frequency response is estimated from the pilots in the filtered and phase rotated pilot frequency domain representation generated at block 1606 through interpolation by, for example, polyphase filtering. It will be evident to a person of skill in the art that this is an example only and other interpolation methods and techniques may be used Once the channel frequency response has been generated the phase rotation applied at block 1604 is removed and the method 1600 proceeds to block 1610.

At block 1610 the channel frequency response generated in block 1608 is used to equalize the received pilot-dense symbol (e.g. P2 symbol). In some examples, a zero forcing technique is used where the symbol sub-carriers to be equalized are divided by the channel estimate for each sub-carrier. It will be evident to a person of skill in the art that this is an example only and other equalization techniques and methods may be used. Once the equalization has been performed the data sub-carriers are extracted and frequency de-interleaved. The method 1600 then proceeds to block 1612.

At block 1612 the noise on the L1-pre sub-carriers is measured. The L1-pre sub-carries are BPSK modulated so the noise on the L1-pre sub-carriers may be measured by evaluating the mean Euclidian distance from the constellation positions. For BPSK the constellation positions are 1+0j or −1+0j.

Blocks 1604 to 1612 are repeated a plurality of times, and each time a different phase rotation is applied to the pilot frequency domain representation. The more phase rotations are applied the higher the accuracy of the path order (and the centering), but this comes at a high processing cost. Testing has shown that applying sixty-five phase rotations provides an acceptable trade-off between accuracy and processing cost. However it will be evident to a person of skill in the art that fewer or more phase rotations may be applied and evaluated. Once blocks 1604 to 1612 have been executed for each phase rotation, the method 1600 proceeds to block 1614 where the rotation with the lowest noise on the L1-pre sub-carriers is selected. The corresponding channel impulse response will reflect the true physical channel—i.e. it will have the correct path order and can then be correctly centered.

To be able to determine the correct path positions (and thus center the CIR) the OFDM receiver 1300 of FIG. 13 may be modified to include a positioning module (not shown) which is configured to implement, for example, the method of FIG. 16.

Figure 17:
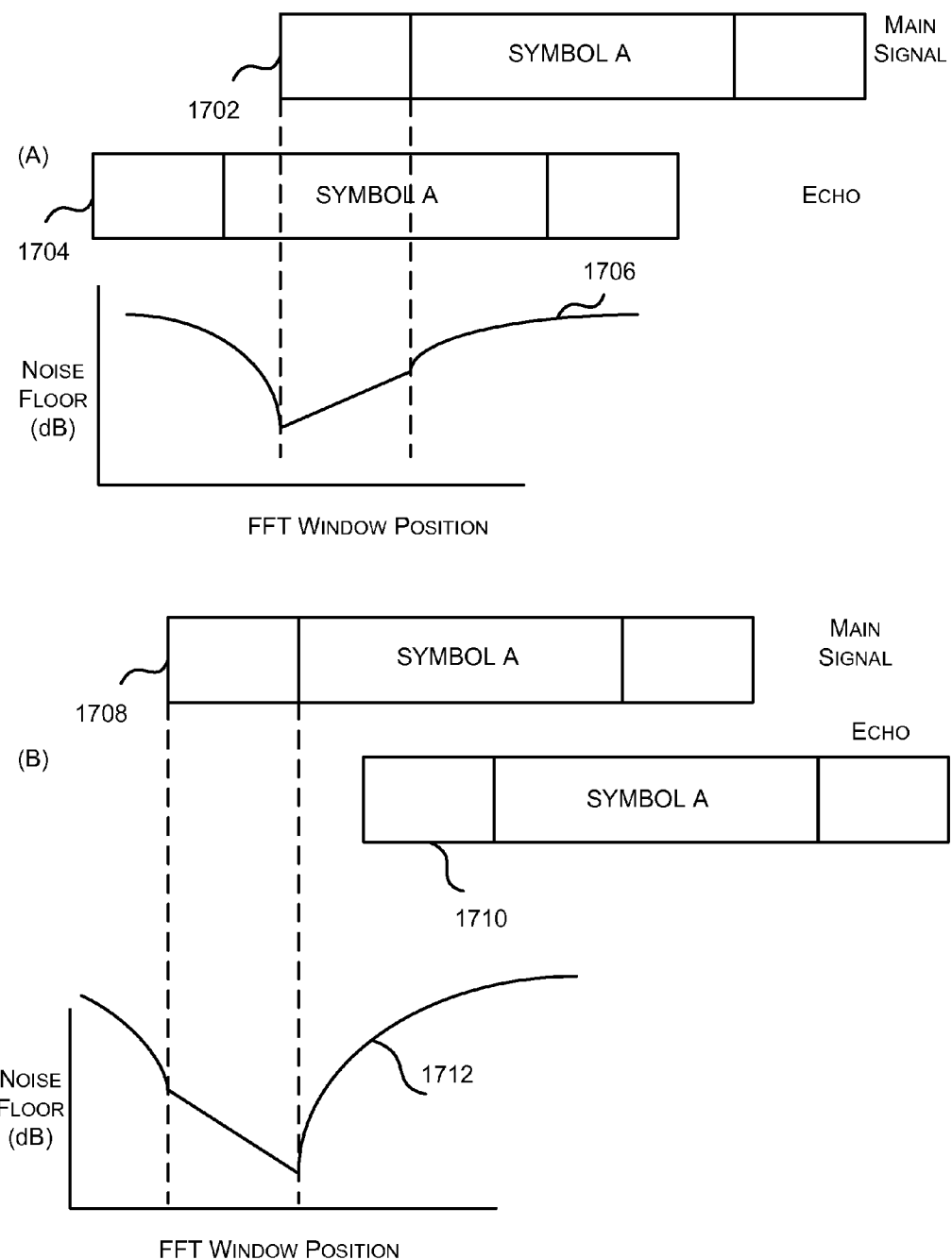
FIG. 17 is a schematic diagram illustrating graphs of the calculated CIR noise floors as a function of FFT window position for two example main signal and echo combinations.

Reference is now made to FIG. 17 which illustrates graphs of the resulting noise floors calculated in accordance with the methods and systems described herein for a main signal with a pre-echo outside the guard interval and a main signal with a post-echo outside the guard interval. In particular (A) of FIG. 17 illustrates a main signal 1702 with a pre-echo 1704 that is outside the guard interval. This results in the CIR noise floor curve 1706 as a function of FFT window position. It can be seen that the lowest noise floor is achieved when the FFT window is positioned at the starting edge of the guard interval indicating this is the best or optimum position for the FFT window to minimize total ISI. Specifically, when the FFT window is positioned here it is able to gain the most power from the echo 1704 while still being able to properly decode symbol A from the main signal 1702.

In contrast, (B) of FIG. 17 illustrates a main signal 1708 and a post-echo 1710 that is outside the guard interval. This results in the CIR noise floor curve 1712. It can be seen that in this case the lowest noise floor is achieved when the FFT window is positioned at the end edge of the guard interval indicating this is the best or optimum position for the FFT window position to minimize total ISI.

Since the methods and systems described here rely solely on the information in a single pilot-dense symbol (e.g. P2 symbol), the method can be performed once to determine the optimum FFT window position for decoding the symbols of the OFDM signal. Ideally the analysis is performed at the beginning of receiver operation because there is a delay before the OFDM signal can be demodulated where the OFDM receiver is obtaining the parameters for decode. In particular, the first frame is used obtain the parameters for decoding so the OFDM receiver can't start decoding frames just by looking at one frame. This provides idle time for the position of the FFT window to be identified using the methods described above. This is in contrast with many other systems for reducing ISI which require continual monitoring.

By doing such a comprehensive analysis once, at the beginning of receiver operation, the OFDM receiver can more quickly converge to the best quality bit error rate. This means that users don't have to put up with excessive errors at the beginning of receiver operation.

That said, the methods described herein could be reconfigured such that instead of selecting and evaluating a high number of potential or possible FFT window positions, only a few possible or potential window positions are selected and evaluated frequently (e.g. per frame) in, for example, an early-later tracking fashion. This of course has the disadvantage of taking much more time to converge and being much more computationally intensive. One of the advantages, however, is the added ability to explicitly measure total ISI in dynamically changing channels if so desired. With a combination of acquire-time analysis and early-late tracking for dynamic, explicit ISI minimization is also possible using the pilot-aided, noise-floor based method disclosed herein.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of decoding an orthogonal frequency division multiplexing (OFDM) signal at an OFDM receiver, the method comprising:
   estimating a channel impulse response directly from a received pilot-dense symbol of the OFDM signal for each of a plurality of potential fast Fourier transform (FFT) window positions, wherein the received pilot-dense symbol has a higher density of pilot cells than a data symbol of the OFDM signal;
   determining directly, from each of the channel impulse responses, a noise floor of that channel impulse responses;
   selecting the potential FFT window position corresponding to the channel impulse response with the lowest noise floor as an optimum FFT window position; and
   decoding at least one symbol of the OFDM signal using the selected optimum FFT window position.

2. The method of claim 1, further comprising selecting the plurality of potential FFT window positions based on the received pilot-dense symbol.

3. The method of claim 2, wherein selecting the plurality of potential FFT window positions based on the received pilot-dense symbol comprises estimating a guard interval for the received pilot-dense symbol and selecting a plurality of potential FFT window positions each shifted from the estimated guard interval by a different amount.

4. The method of claim 3, wherein the number of potential FFT window positions selected closer to the guard interval edges is greater than the number of potential FFT window positions selected farther away from the guard interval edges.

5. The method of claim 1, wherein estimating the channel impulse response from the received pilot-dense symbol for a particular potential FFT window position comprises:
   performing a FFT on samples of the received pilot-dense symbol falling within an FFT window defined by the particular potential FFT window position to generate a frequency domain representation of the pilot-dense symbol;
   extracting pilot sub-carriers from the frequency domain representation of the pilot-dense symbol to generate a pilot frequency domain representation; and
   performing an IFFT on the pilot frequency domain representation to generate an estimate of the channel impulse response for the particular potential FFT window position.

6. The method of claim 1, further comprising determining an optimum position of the channel impulse response for the optimum FFT window position.

7. The method of claim 6, wherein determining the optimum position of the channel impulse response for the optimum FFT window position comprises:
   performing a FFT on samples of the received pilot-dense symbol falling within an FFT window defined by the optimum FFT window position to generate a frequency domain representation of the pilot-dense symbol;
   applying each of a plurality of phase rotations to the frequency domain representation of the pilot-dense symbol to generate a plurality of phase rotated frequency domain representations of the pilot-dense symbol;
   generating a channel frequency response estimate for each phase rotated frequency domain representation of the pilot-dense symbol based on pilots in the phase rotated frequency domain representation;
   equalizing the received pilot-dense symbol based on each channel frequency response estimate;
   measuring an amount of noise on L1-pre sub-carriers for each equalized pilot-dense symbol; and
   selecting the phase rotation corresponding to the channel frequency response producing the lowest noise on the L1-pre sub-carriers.

8. An orthogonal frequency division multiplexing (OFDM) receiver comprising:
   a channel impulse response generation module configured to estimate a channel impulse response directly from a received pilot-dense symbol of an OFDM signal for each of a plurality of potential fast Fourier transform (FFT) window positions, wherein the received pilot-dense symbol has a higher density of pilot cells than a data symbol of the OFDM signal;

a noise floor estimation module configured to determine directly, from each of the estimated channel impulse responses, a noise floor of that estimated channel impulse response; and an optimum FFT window position selection module configured to select the potential FFT window position corresponding to the estimated channel impulse response with a lowest noise floor as an optimum FFT window position for use in decoding at least one symbol of said OFDM signal.

9. The OFDM receiver of claim 8, further comprising a potential FFT window position generation module configured to select the plurality of potential FFT window positions based on the received pilot-dense symbol.

10. The OFDM receiver of claim 9, wherein the potential FFT window position generation module is configured to select the plurality of potential FFT window positions based on the received pilot-dense symbol by estimating a guard interval for the received pilot-dense symbol and selecting a plurality of potential FFT window positions each shifted from the estimated guard interval by a different amount.

11. The OFDM receiver of claim 10, wherein the potential FFT window position generation module is configured to select a greater number of potential FFT window positions closer to the guard interval edges than the number of selected potential FFT window positions farther away from the guard interval edges.

12. The OFDM receiver of claim 8, wherein the channel impulse response generation module comprises:

an FFT module configured to perform a FFT on samples of the received pilot-dense symbol falling within an FFT widow defined by a particular potential FFT window position to generate a frequency domain representation of the pilot-dense symbol;

a pilot extraction module configured to extract pilot sub-carriers from the frequency domain representation of the pilot-dense symbol to generate a pilot frequency domain representation; and an IFFT module configured to perform an inverse fast Fourier transform (IFFT) on the pilot frequency domain representation to generate an estimate of the channel impulse response for the particular potential FFT window position.

13. The OFDM receiver of claim 12, wherein each of the plurality of potential FFT window positions is associated with a time shift relative to a reference FFT window position; and the channel impulse response generation module further comprises a slope cancellation module configured to apply a phase slope cancellation to the frequency domain representation of the pilot-dense symbol corresponding to the time shift associated with the particular potential FFT window position prior to providing the frequency domain representation of the pilot-dense symbol to the pilot extraction module.

14. The OFDM receiver of claim 12, wherein the channel impulse response generation module further comprises a scale module configured to apply power normalization to the pilot frequency domain representation in accordance with a reference FFT window position prior to providing the pilot frequency domain representation to the IFFT module.

15. The OFDM receiver of claim 8, wherein the noise floor estimation module comprises a threshold module configured to apply a threshold to a particular channel impulse response to generate a representation of the noise floor for the particular channel impulse response.

16. The OFDM receiver of claim 15, wherein the noise floor estimation module further comprises a decimation module configured to decimate the particular channel impulse response before providing the particular channel impulse response to the threshold module.

17. The OFDM receiver of claim 15, wherein applying the threshold to the particular channel impulse response eliminates high power peaks from the particular channel impulse response.

18. The OFDM receiver of claim 8, further comprising a positioning module configured to determine an optimum position of the channel impulse response for the optimum FFT window position.

19. The OFDM receiver of claim 18, wherein the positioning module is configured to determine the optimum position of the channel impulse response for the optimum FFT window position by:

performing a FFT on samples of the received pilot-dense symbol falling within an FFT window defined by the optimum FFT window position to generate a frequency domain representation of the pilot-dense symbol;

applying each of a plurality of phase rotations to the frequency domain representation of the pilot-dense symbol to generate a plurality of phase rotated frequency domain representations of the pilot-dense symbol;

generating a channel frequency response estimate for each phase rotated frequency domain representation of the pilot-dense symbol based on pilots in the phase rotated frequency domain representation;

equalizing the received pilot-dense symbol based on each channel frequency response estimate;

measuring an amount of noise on L1-pre sub-carriers for each equalized pilot-dense symbol; and selecting the phase rotation corresponding to the channel frequency response producing the lowest noise on the L1-pre sub-carriers.

20. The OFDM receiver of claim 8, wherein the channel impulse response generation module is configured to generate each of the channel impulse responses from the same pilot-dense symbol.

* * * * *